US012472475B2

(12) United States Patent
Usta et al.

(10) Patent No.: US 12,472,475 B2
(45) Date of Patent: Nov. 18, 2025

(54) METHODS OF SUPERCOOLING AQUEOUS SAMPLES

(71) Applicant: The General Hospital Corporation, Boston, MA (US)

(72) Inventors: Osman Berk Usta, Swampscott, MA (US); Haishui Huang, Allston, MA (US); Martin Yarmush, Newton, MA (US)

(73) Assignee: The General Hospital Corporation, Boston, MA (US)

( * ) Notice: Subject to any disclaimer, the term of this patent is extended or adjusted under 35 U.S.C. 154(b) by 805 days.

(21) Appl. No.: 16/966,764

(22) PCT Filed: Feb. 1, 2019

(86) PCT No.: PCT/US2019/016346
§ 371 (c)(1),
(2) Date: Jul. 31, 2020

(87) PCT Pub. No.: WO2019/152837
PCT Pub. Date: Aug. 8, 2019

(65) Prior Publication Data
US 2021/0039057 A1    Feb. 11, 2021

Related U.S. Application Data

(60) Provisional application No. 62/716,711, filed on Aug. 9, 2018, provisional application No. 62/625,754, filed on Feb. 2, 2018.

(51) Int. Cl.
*C12N 1/00*    (2006.01)
*A01N 1/125*   (2025.01)
(Continued)

(52) U.S. Cl.
CPC ............ *B01F 23/802* (2022.01); *A01N 1/125* (2025.01); *B01F 23/4105* (2022.01); *B01F 23/48* (2022.01)

(58) Field of Classification Search
CPC ...... B01F 23/802; B01F 23/48; A01N 1/0221; A01N 1/125; A01N 1/122
See application file for complete search history.

(56) References Cited

U.S. PATENT DOCUMENTS 4,863,865 A *  9/1989  Franks ................... A01N 3/00
                                                  435/243
8,679,735 B2   3/2014  Fahy et al.
(Continued)

FOREIGN PATENT DOCUMENTS

AU    2007/273525    1/2008
EP    0136030        4/1985
(Continued)

OTHER PUBLICATIONS

Preserving Livers for Transplantation (Jul. 21, 2014) (Year: 2014).*
(Continued)

*Primary Examiner* — Tracy Vivlemore
*Assistant Examiner* — Lauren K Van Buren
(74) *Attorney, Agent, or Firm* — Fish & Richardson P.C.

(57) ABSTRACT

This disclosure relates to methods of super-cooling of aqueous samples with or without biological samples. The methods involve, e.g., providing a container comprising the aqueous sample; applying an immiscible liquid phase of sufficient thickness to separate the aqueous sample from air; and cooling the aqueous sample to a temperature that is below 0° C.

28 Claims, 18 Drawing Sheets

(51) Int. Cl.
  *B01F 23/41* (2022.01)
  *B01F 23/80* (2022.01)
  *C12N 1/04* (2006.01)
  *C12N 1/30* (2006.01)
  *C12N 5/00* (2006.01)
  *B01F 23/40* (2022.01)

(56) References Cited

U.S. PATENT DOCUMENTS

| | | | |
|---|---|---|---|
| 8,771,733 | B2 | 7/2014 | Cruanes et al. |
| 2002/0063235 | A1 | 5/2002 | Fahy et al. |
| 2009/0302265 | A1* | 12/2009 | Fujikawa ............... C07H 17/07 536/8 |
| 2009/0305224 | A1 | 12/2009 | He et al. |
| 2012/0141974 | A1* | 6/2012 | Livesey ............... A01N 1/0226 435/2 |
| 2013/0260452 | A1 | 10/2013 | Toner et al. |
| 2015/0017628 | A1 | 1/2015 | Gibson et al. |

FOREIGN PATENT DOCUMENTS

| | | |
|---|---|---|
| EP | 2045306 | 4/2009 |
| JP | 2009/005584 | 1/2009 |
| WO | WO 2008/147160 | 12/2008 |
| WO | WO 2016/154206 | 9/2016 |

OTHER PUBLICATIONS

Dorsey et al. "Spontaneous Freezing of Water" The Scientific Monthly, vol. 78, No. 5 (May 1954), pp. 283-288 (Year: 1954).*

Merriam Webster, "Bulk Definition" Dictionary (Year: 2023).*

Blagden, "Experiments on the cooling of water below its freezing point," Philosophical Transactions of the Royal Society of London, 1788, 78:125-146.

Goyer et al., "Shock Induced Freezing of Supercooled Water," Journal of Applied Meteorology, 1965, 4:156-160.

Hozumi et al., "Effect of bubble nuclei on freezing of supercooled water," International Journal of Refrigeration, 2002, 25(2):243-249.

Li, "Strong tolerance to freezing is a major survival strategy in insects inhabiting central Yakutia (Sakha Republic, Russia), the coldest region on earth," Cryobiology, 2016, 73(2):221-225, 6 pages.

Partial Supplementary European Search Report in European Appln. No. 19747634.4, dated Sep. 29, 2021, 24 pages.

Qin et al., "Determination of liver vol. in vivo in rats using MRI," European Journal of Radiology, 1990, 11(3):191-195.

Smith et al., "Oil-continuous microemulsions composed of hexane, water, and 2-propanol," Journal of Colloid and Interface Science, 1977, 60(3):488-496.

Extended European Search Report in European Appln. No. 19747634.4, dated Jan. 17, 2022, 20 pages.

Abdelmonem et al., "Surface charge-induced orientation of interfacial water suppresses heterogeneous ice nucleation on α-alumina," Atmospheric Chemistry & Physics, Jun. 2017, 17(12).

Atkinson et al., "The importance of feldspar for ice nucleation by mineral dust in mixed-phase clouds," Nature, Jun. 2013, 498(7454):355-358.

Bartels-Rausch, "Ten things we need to know about ice and snow," Nature, Feb. 2013, 494(7435):27-29.

Berendsen et al., "Supercooling enables long-term transplantation survival following 4 days of liver preservation," Nat. Med., Jul. 2014, 20(7):790-793.

Burkhardt & Kärcher, "Global radiative forcing from contrail cirrus," Nature Climate Change, Apr. 2011, 1(1):54-58.

Cahn, "Critical point wetting, " The Journal of Chemical Physics, Apr. 1977, 66(8):3667-3672.

Costanzo et al., "Hibernation physiology, freezing adaptation and extreme freeze tolerance in a northern population of the wood frog," J. Exp. Biol., Sep. 2013, 216(18):3461-3473.

Cox et al., "Molecular simulations of heterogeneous ice nucleation. I. Controlling ice nucleation through surface hydrophilicity," J. Chem. Phys., May 2015, 142(18):184704.

D'Alessandro et al., "Red blood cell storage: the story so far," Blood Transfusion, Apr. 2010, 8(2):82-88.

Dai & Evans, "Molecular Dynamics Simulations of Template-Assisted Nucleation: Alcohol Monolayers at the Air-Water Interface and Ice Formation," The Journal of Physical Chemistry B, Jul. 2001, 105(44):10831-10837.

Djikaev et al., "Thermodynamic conditions for the surface-stimulated crystallization of atmospheric droplets," The Journal of Physical Chemistry, Oct. 2002, 106(43):10247-10253.

Ehre et al., "Water freezes differently on positively and negatively charged surfaces of pyroelectric materials," Science, Feb. 2010, 327(5966):672-675.

Fitzner et al., "The Many Faces of Heterogeneous Ice Nucleation: Interplay Between Surface Morphology and Hydrophobicity," J. Am. Chem. Soc., Oct. 2015, 137(42):13658-13669.

Fukuto et al., "Nanoscale Structure of the Oil-Water Interface," Phys. Rev. Lett., Dec. 2016, 117(25):256102.

Gavish et al., "Ice nucleation by alcohols arranged in monolayers at the surface of water drops," Science, Nov. 1990, 250(4983):973-975.

Gholaminejad & Hosseini, "A study of water supercooling," Journal of Electronics Cooling and Thermal Control, Mar. 2013, 3:1-6.

Gupta et al., "Nanoemulsions: formation, properties and applications," Soft Matter, Mar. 2016, 12(11):2826-2841.

Hickling, "Nucleation of freezing by cavity collapse and its relation to cavitation damage," Nature, May 1965, 206(4987):915-917.

Hickling., "Transient, high-pressure solidification associated with cavitation in water," Phys. Rev. Lett., Nov. 1994, 73(21):2853-2856.

Hoose and Möhler, "Heterogeneous ice nucleation on atmospheric aerosols: a review of results from laboratory experiments," Atmospheric Chemistry and Physics, Oct. 2012, 12(20):9817-9854.

Huang et al., "Long-term deep-supercooling of large-volume water and red cell suspensions via surface sealing with immiscible liquids," Nature Communications, Aug. 2018, 9(1):1-10.

Huang et al., "Pre-dehydration and Ice Seeding in the Presence of Trehalose Enable Cell Cryopreservation," ACS Biomaterials Science & Engineering, Aug. 2017, 3(8):1758-1768.

James et al., "A review of novel and innovative food freezing technologies," Food and Bioprocess Technology, Aug. 2015, 8(8):1616-1634.

Jensen et al., "Water in contact with extended hydrophobic surfaces: direct evidence of weak dewetting," Phys. Rev. Lett., 2003. 90(8):086101, 4 pages.

Knight, "The contact angle of water on ice. Journal of Colloid and Interface Science," Oct. 1967, 25(2):280-284.

Konno & Izumiyama., "On the relationship of the oil/water interfacial tension and the spread of oil slick under ice cover," Proceedings of the 17th International Symposium on Okhotsk Sea and Sea Ice, 2002, 275-282.

Koop et al., "Freezing of HNO3/H2SO4/H2O solutions at stratospheric temperatures: Nucleation statistics and experiments," The Journal of Physical Chemistry, Feb. 1997, 101(6):1117-1133.

Krämer et al., "Homogeneous nucleation rates of supercooled water measured in single levitated microdroplets," The Journal of Chemical Physics, Oct. 1999, 111(14):6521-6527.

Langham & Mason, "The heterogeneous and homogeneous nucleation of supercooled water," Proceedings of the Royal Society of London A: Mathematical, Physical and Engineering Sciences, 1958, 247(1251):493-504.

Moore et al., "Structural transformation in supercooled water controls the crystallization rate of ice," Nature, Nov. 2011, 479(7374):506-508.

Mondal et al., "Alkyl Chain Length Dependent Structural and Orientational Transformations of Water at Alcohol-Water Interfaces and Its Relevance to Atmospheric Aerosols," J. Phys. Chem. Lett., Apr. 2017, 8(7):1637-1644.

Morris & Acton, "Controlled ice nucleation in cryopreservation—a review," Cryobiology, Apr. 2013, 66(2):85-92.

Murray et al., "Kinetics of the homogeneous freezing of water," Phys. Chem. Chem. Phys., Sep. 2010, 12(35):10380-10387.

(56) References Cited

OTHER PUBLICATIONS

Nagare et al., "Comparing contact and immersion freezing from continuous flow diffusion chambers," Atmospheric Chemistry and Physics, Feb. 2016, 16(14):8899-8914.

Niedermeier et al., "Heterogeneous ice nucleation: exploring the transition from stochastic to singular freezing behavior," Atmospheric Chemistry and Physics, 2011, 11(16):8767-8775.

Paasimaa, "Factors affecting water solubility in oils," Vaisala News, 2005, 169:24-25.

PCT International Preliminary Report on Patentability in International Appln. No. PCT/US2019/016346, dated Aug. 4, 2020, 8 pages.

PCT International Search Report and Written Opinion in International Appln. No. PCT/US2019/016346, dated May 15, 2019,.

Popovitz-Biro et al., "Induced freezing of supercooled water into ice by self-assembled crystalline monolayers of amphiphilic alcohols at the air-water interface," Journal of the American Chemical Society, Feb. 1994, 116(4):1179-1191.

Poynor et al., "How water meets a hydrophobic surface," Physical Review Letters, Dec. 2006, 97(26):266101, 4 pages.

Qiu & Molinero, "Strength of Alkane-Fluid Attraction Determines the Interfacial Orientation of Liquid Alkanes and Their Crystallization through Heterogeneous or Homogeneous Mechanisms," Crystals, Mar. 2017, 7(3):86.

Qiu et al., "Ice Nucleation Efficiency of Hydroxylated Organic Surfaces is Controlled by Their Structural Fluctuations and Mismatch to Ice," J. Am. Chem. Soc., Mar. 2017, 139(8):3052-3064.

Sanz et al., "Homogeneous ice nucleation at moderate supercooling from molecular simulation," Journal of the American Chemical Society, Oct. 2013, 135(40):15008-15017.

Sear, "Nucleation at contact lines where fluid-fluid interfaces meet solid surfaces," Journal of Physics: Condensed Matter, Oct. 2007, 19(46):466106.

Seeley & Seidler, "Two-dimensional nucleation of ice from supercooled water," Phys. Rev. Lett., 2001, 87(5):055702, 4 pages.

Shaw et al., "Heterogeneous surface crystallization observed in undercooled water," J. Phys. Chem. B., May 2005, 109(20):9865-9868.

Sugimachi et al., "Nonmetabolizable Glucose Compounds Impart Cryotolerance to Primary Rat Hepatocytes," Tissue Engineering, Mar. 2006, 12(3)579-588.

Suzuki et al., "Freezing of water droplets on silicon surfaces coated with various silanes," Chemical Physics Letters, Sep. 2007, 445(1):37-41.

Tabazadeh et al., "Surface crystallization of supercooled water in clouds," Proc. Natl. Acad. Sci. USA, May 2002, 99(25):15873-15878.

Usta et al., "Supercooling as a viable non-freezing cell preservation method of rat hepatocytes," PloS One, Jul. 2013, 8(7):e69334.

Wick et al., "Computational investigation of the n-alkane/water interface with many-body potentials: the effect of chain length and ion distributions," The Journal of Physical Chemistry C, Jan. 2011, 116(1):783-790.

Yiu et al., "Cryosurgery: A review," Int. J. Angiol., 2007, 16(1):1-6.

Office Action in European Appln. No. 19747634.4, mailed on Nov. 26, 2024, 10 pages.

* cited by examiner

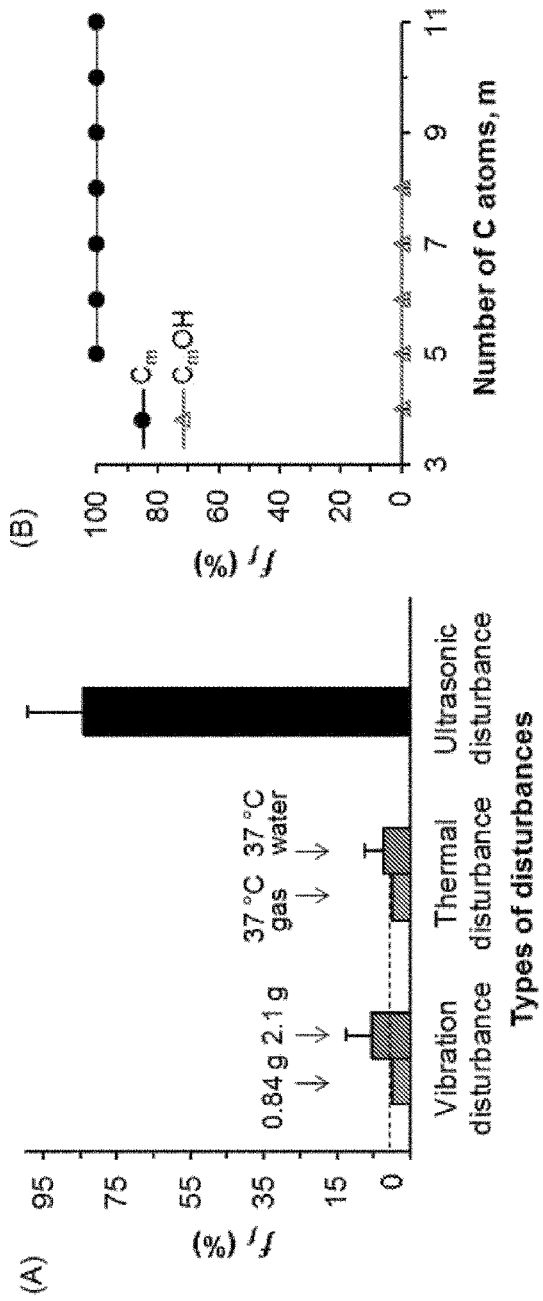
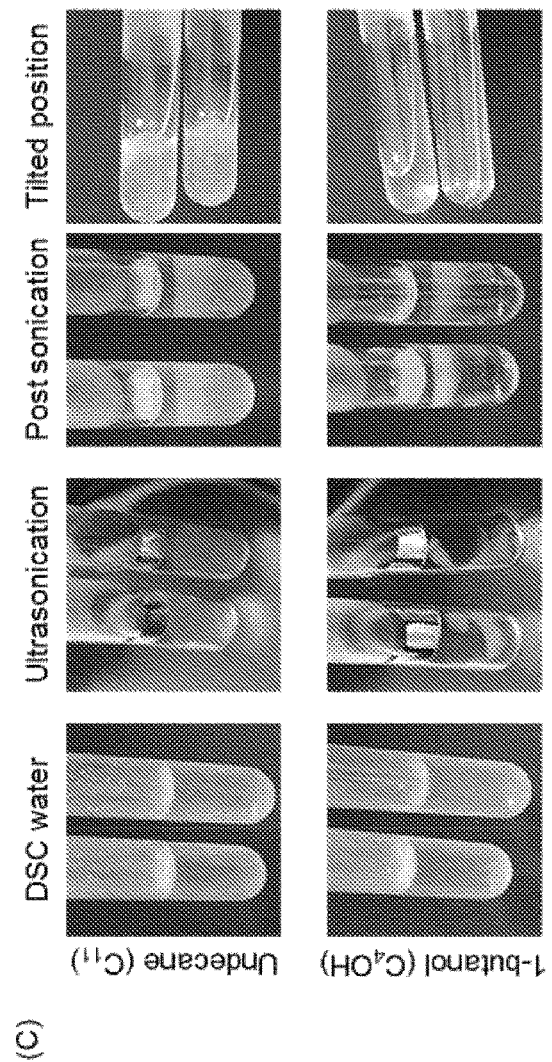
FIGS. 4A-4C (A)

(B)

METHODS OF SUPERCOOLING AQUEOUS SAMPLES

CLAIM OF PRIORITY

This application is a § 371 National Stage Application of PCT/US2019/016346, filed Feb. 1, 2019, which claims the benefit of U.S. Provisional Patent Application Ser. Nos. 62/625,754, filed on Feb. 2, 2018, and 62/716,711, filed on Aug. 9, 2018. The entire contents of the foregoing are hereby incorporated by reference.

STATEMENT OF FEDERALLY SPONSORED RESEARCH

This invention was made with government support under Grant no. 5P41EB002503 awarded by the National Institutes of Health. The Government has certain rights in the invention.

TECHNICAL FIELD

This disclosure relates to supercooling of aqueous solutions and/or suspensions.

BACKGROUND

Water freezing is one of the most important yet least understood phenomena in our daily life and scientific research [1, 2]. Under normal atmospheric conditions, water transitions into ice at 0° C., i.e. the melting point or the equilibrium temperature ($T_e$). Extremely pure water can theoretically be "supercooled" at standard pressure down to its crystal homogeneous nucleation temperature which is far below 0° C., e.g., down to −48.3° C. (Moore et al. "structural transformation in supercooled water controls the crystallization rate of ice". Nature. 479: 506-508, 2011). For example, without external nuclei, water and aqueous solutions will maintain a supercooled liquid state well below the melting point until homogeneous ice nucleation occurs.

The supercooled water has various applications, e.g., making better beverage, storing food, preserving cells, and drug delivery. However, it is very difficult to maintain supercooled water unfrozen, especially for aqueous solutions and suspensions with the following three conditions at the same time, a large volume, under a high degree of supercooling ($\Delta T$), and for an extended period of time. There is a need to develop better methods of supercooling of aqueous solutions and/or suspensions.

SUMMARY

This disclosure relates to super-cooling of aqueous solutions and/or suspensions, and methods for long-term deep supercooling of large-volume water via surface sealing with an immiscible liquid phase.

In one aspect, the disclosure provides methods of supercooling an aqueous sample. The methods involve providing a container containing the aqueous sample; applying an immiscible liquid phase of sufficient thickness to separate the aqueous sample from air; and cooling the aqueous sample to a temperature that is below 0° C.

In some embodiments, the aqueous sample is an aqueous solution, or an aqueous suspension.

In some embodiments, the aqueous sample has a volume of greater than 10 ml, 100 ml, 1000 ml, or 10000 ml.

In some embodiments, the temperature is below −4° C., −5° C., −6° C., −7° C., −8° C., −9° C., −10° C., −11° C., −12° C., −13° C., −14° C., −15° C., −16° C., −17° C., −18° C., −19° C. or −20° C.

In some embodiments, the immiscible liquid phase comprises, consists of, or consists essentially of mineral oil, paraffin oil, olive oil, nutmeg oil, or a mixture thereof.

In some embodiments, the immiscible liquid phase comprises, consists of, or consists essentially of one or more compounds selected from the group consisting of alkanes, alkenes, alkynes, benzenes, alcohols, alkanoic acids, aldehydes, ketones, esters, polydimethylsiloxane (PDMS), and derivatives thereof.

In some embodiments, the immiscible liquid phase comprises, consists of, or consists essentially of a primary alcohol. In some embodiments, the primary alcohol is 1-pentanol ($CH_3(CH_2)_3CH_2OH$) or 1-hexanol ($CH_3(CH_2)_4CH_2OH$).

In some embodiments, the immiscible liquid phase comprises, consists of, or consists essentially of undecane ($CH_3(CH_2)_9CH_3$).

In some embodiments, the aqueous sample is maintained in supercooled state for more than 10 days, 20 days, 30 days, 40 days, 50 days, 60 days, 60 days, 70 days, 80 days, 90 days, 100, or 300 days.

In some embodiments, the aqueous sample contains a biological sample. In some embodiments, the biological sample is perfused with and/or submerged in the aqueous sample. In some embodiments, the biological sample is a cell, a tissue sample, an organ, or an organism. In some embodiments, the organ is a liver, a heart, a lung, an eye, or a kidney. In some embodiments, the biological sample is blood.

In some embodiments, the aqueous sample comprises, consists of, or consists essentially of a cold storage solution.

In some embodiments, the aqueous sample further comprises PEG. In some embodiments, the aqueous sample further comprises trehalose. In some embodiments, the aqueous sample further comprises 3-O-methyl glucose (3-OMG).

In some embodiments, the biological sample can be cryopreserved for more than 7 days, 10 days, 1 month, 2 months, or 3 months while maintaining viability.

In some embodiments, after the sample is maintained in a supercooled state, the method further comprises heating the aqueous sample to a temperature that is above 0° C.

In some embodiments, the aqueous sample further comprises an anti-nucleation agent. In some embodiments, the aqueous sample further comprises a cryoprotective agent.

In some embodiments, cooling the sample comprises lowering the temperature by 0.1 to 10° C. per minute.

In some embodiments, the immiscible liquid phase consists of one compound selected from the group consisting of alkanes, alkenes, alkynes, benzenes, alcohols, alkanoic acids, aldehydes, ketones, esters, polydimethylsiloxane (PDMS), and derivatives thereof.

In some embodiments, the immiscible liquid phase consists of a primary alcohol.

In some embodiments, the immiscible liquid phase consists of 1-pentanol ($CH_3(CH_2)_3CH_2OH$) or 1-hexanol ($CH_3(CH_2)_4CH_2OH$).

In another aspect, the disclosure provides methods of maintaining a biological sample in an aqueous sample in a supercooled state for more than 3, 5, 7, 10, 20, 30, 50, 100 or more days. The methods involve providing a container comprising the biological sample in an aqueous sample; applying an immiscible liquid phase of sufficient thickness to separate the aqueous sample from air; and cooling the aqueous sample to a temperature that is below 0° C.

In some embodiments, the immiscible liquid phase comprises, consists of, or consists essentially of one, two, three, four, five or more compounds (e.g., only one compound) as described herein.

In one aspect, the disclosure provides methods of making an emulsion. The methods involve applying an immiscible liquid phase comprising an alkane and an alcohol to an aqueous sample. In some embodiments, the alcohol has a concentration of less than 10%, 9%, 8%, 7%, 6%, 5%, 4%, 3%, 2%, or 1% (v/v) in the immiscible liquid phase.

In one aspect, the disclosure provides a method of removing a hydrophilic molecule from a sample, the method comprising applying an immiscible liquid phase comprising an alkane and an alcohol to a sample. In some embodiments, the sample is an aqueous sample.

In one aspect, the disclosure provides a method of altering a solute's concentration in a solution, the method comprising applying an immiscible liquid phase comprising an alkane and an alcohol to the solution. In some embodiments, the solution is an aqueous solution.

As used herein, the term "supercooling" refers to the process of cooling a liquid below its freezing point without any ice formation.

As used herein, the term "anti-nucleation agent" or "ice blocker" refers to a compound (e.g., a polymer or polypeptide) that prevents or inhibits ice nucleation and growth. Non-limiting examples of ice blockers include polyvinyl alcohol, polyglycerol, antifreeze proteins, and other polymer and peptides referred to in the art as ice blockers.

As used herein, the term "aqueous sample" refers to a sample comprising water. The aqueous sample can contain biological samples (e.g., cells, tissue, organs, or organism) in it. These biological samples can be suspended or submerged in the aqueous sample.

As used herein, the term "aqueous solution" refers to a solution in which the solvent is water.

As used herein, the term "aqueous suspension" refers to a heterogeneous mixture of particles in water. These particles are insoluble. In some embodiments, these particles can be biological sample particles, e.g., virus, bacteria, cells, or tissues.

As used herein, the term "immiscible liquid phase" refers to a liquid substance that cannot be mixed with water to form a homogenous solution.

As used herein, the term "cryopreserve" refers to the process of preserving samples (e.g., biological samples) by cooling them below 0° C.

As used herein, the term "cryopreservation solution" or "cryopreservation media" refers to any solution or media which is used to cool and preserve biological samples (e.g., cells).

As used herein, the term "cryoprotective agent," "cryoprotectant," or "CPA" refers to a compound used to slow or prevent ice nucleation, ice-crystal growth, ice formation, or any combination thereof. Cryoprotectants are generally agents with high water solubility and low toxicity. Included within this term are both permeating (e.g., glycerol, ethylene glycol, 1,2-propanediol, and DMSO) and non-permeating (e.g., sugars, dextran, polyvinyl pyrrolidone and hydroxyethyl starch) cryoprotectants. Non-limiting examples of cryoprotectants useful in the methods of the disclosure are ethylene glycol, glycerol, 1,2-propanediol, DMSO, and sugars (e.g., sucrose, trehalose, raffinose, stachyose, and dextran).

As used herein, the term "sufficient thickness" refers to the thickness of the immiscible liquid phase is sufficient to provide an air-impermeable layer, e.g., at least one molecular layer, preferably at least two, three, four, or more molecules thick.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 4A. $f_f$ of DSC water sealed by MO under various disturbances. Vibrational disturbance was imposed by shaking plate with different shaking frequencies and centrifugal forces (i.e. 0.84 g or 2.1 g). Thermal disturbance was imposed by placing or plunging the DSC tubes into 37° C. incubator (37° C. gas) or water bath (37° C. water). Ultrasonic disturbance was introduced by putting the DSC tubes into 40 kHz ultrasonic water bath. n=6, N=48.

FIG. 4B. $f_f$ of DSC water sealed by linear alkanes and primary alcohols under 40 kHz ultrasonic disturbance. n=3, N=24 (except for $C_5$, N=8).

FIG. 4C. Representative image sequences of ultrasonication tests for DSC water sealed by linear alkanes or primary alcohols.

DETAILED DESCRIPTION

Figures 1A, 1B, 1C, 1D:
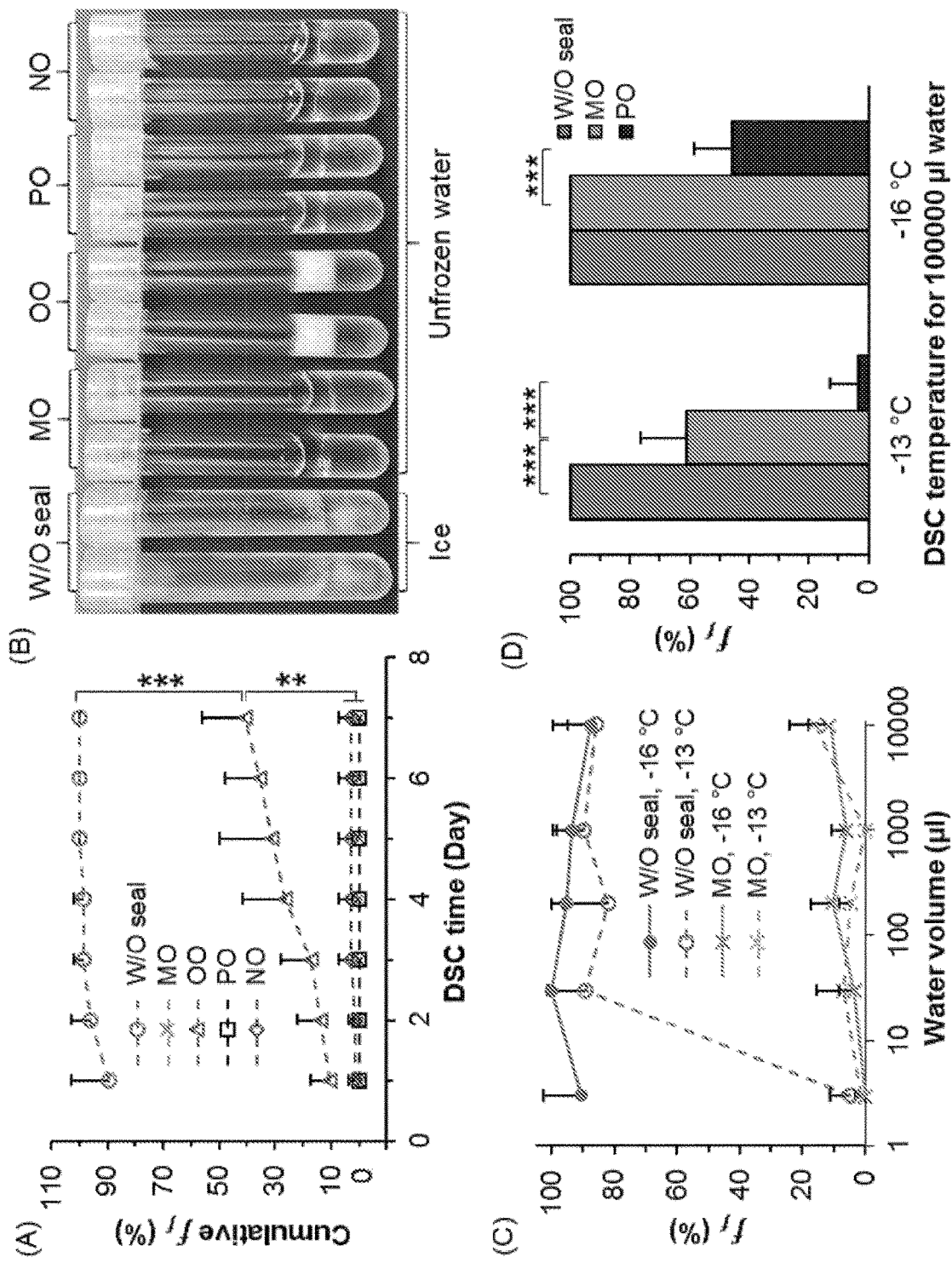
FIG. 1A. Cumulative freezing frequency ($f_f$) for 1 ml water at −13° C. over 7-day DSC, without sealing (W/O seal), with surface sealing by light mineral oil (MO), olive oil (OO), heavy paraffin oil (PO), and nutmeg oil (NO). Number of independent experiments n=6, number of total tested samples for each case N=56. NS: $p>0.05$; *: $0.005<p<0.05$; : $1.0\times10^{-6}<p<0.005$, *: $p<1.0\times10^{-6}$. Error bar represents standard deviation.
FIG. 1B. Corresponding samples of FIG. 1A post 1-day storage.
FIG. 1C. $f_f$ of DSC water of various volumes post 1-day storage at −13 and −16° C. n=7, N=272, 145, 336, 123, and 125 for 3, 30, 200, 1000, and 10000 μl water, respectively.
FIG. 1D. $f_f$ of 100000 μl water with different sealing oils and temperatures post 1-day storage, n=7, N=35.

Supercooling of aqueous solutions below their melting point without any crystallization is a fundamentally and practically important physical phenomenon with numerous applications in biopreservation and beyond. Under normal circumstances, heterogeneous nucleation mechanisms critically prohibit the simultaneous long-term (>1 week), large volume (>1 ml) and low temperatures (<−10° C.) supercooling of aqueous solutions. Thus, to the best knowledge of the inventors, deep supercooling (DSC, ΔT>10° C.) of water with large-volume (e.g., >1 ml) for long-term (e.g., >1 week) has not yet been achieved for biopreservation purposes [16-18]. Here, in order to overcome this bottleneck and enable novel supercooling applications, this disclosure provides the use of surface sealing of water by a hydrocarbon-based immiscible phase (e.g., an oil phase) to drastically diminish the primary heterogeneous nucleation at the water/air interface. Using this approach, this disclosure demonstrates that it is possible to achieve deep supercooling (e.g., as low as −20° C.) of large-volumes of water (e.g., equal to or greater than 100 ml) for long periods (e.g., as long as 100 days) simultaneously.

Since oils are mixtures of various hydrocarbons, this disclosure also tests the use of pure alkanes and primary alcohols of various lengths. All alcohols and some of the longer alkane chains show high capacity to inhibit freezing. The relationship of this capacity with the chain length, however, shows opposite trends for alcohols and alkanes due to their drastically different interfacial structures with the water molecules. Furthermore, the disclosure demonstrates that the deep supercooled water (at −20° C.) can withstand vibrational and thermal disturbances with sealing agents as described herein, but would freeze by ultrasonication if sealed by pure alkanes or oils, but not alcohols.

The observations herein using laboratory grade oils demonstrated that replacing the water/air interface, which is the primary ice nucleation site, with a water/oil interface dramatically inhibits stochastic freezing processes. The time independent nature of the freezing frequency of oil-sealed water suggests that its freezing is case-specific rather than stochastic. The results with linear alkanes and primary alcohols show that freezing inhibition can be achieved by surface sealing with starkly different interfacial structures and mechanisms, which results in opposite trends of inhibition capacity correlated to the chain length. While all sealed DSC water show great stability under vibrational and thermal disturbances simulating normal storage and transportation conditions, only the primary alcohol sealed supercooled water can withstand ultrasonication.

Beyond its fundamental implications, deep supercooling of large volumes of aqueous solutions can provide new biopreservation methodologies for cell, tissue, and organ engineering and transplantation, as well as other high impact areas, such as food preservation.

Supercooling

Water freezing is one of the most important yet least understood phenomena in daily lives and scientific research [1, 2]. Ice formation of water microdroplets in atmospheric clouds is a crucial element for precipitation and reflection of solar radiation [3, 4]. Furthermore, chilling and freezing are important strategies to combat cold weather for ectothermic animals [5], treat malignant diseases via cryotherapy [6], and preserve food and various biological samples, such as cells, tissues, and organs [7, 8]. Under normal atmospheric conditions, ice transitions into water at 0° C., i.e. the melting point or the equilibrium temperature ($T_e$). Nevertheless, the observed freezing temperature ($T_f$) for pure water is usually below the equilibrium temperature ($T_e$).

Water in the liquid phase below the equilibrium temperature is said to be "supercooled" where $\Delta T = T_e - T_f$ measures the degree of supercooling. Supercooled water is intrinsically metastable and can spontaneously transform to lower-energy-level ice crystals through the formation of ice nuclei, which can be readily achieved by ice seeding [9], ultrasonicating [10], or presenting ice-nucleating agents [11]. On the contrary, it is very difficult to maintain supercooled water unfrozen, especially for a large volume, under a high degree of supercooling ($\Delta T$), or for a long period, as each of these increases the possibility of ice nucleation and water freezing.

For instance, $\Delta T$ of a water droplet decreases logarithmically with its volume under a constant cooling rate [12]. Similarly, supercooling frequency ($f_s$, $f_s$=number of unfrozen droplets/number of total droplets) of an ensemble of droplets decreases exponentially with droplet volume, storage time, and nucleation rate (J) [13, 14], while J itself increases exponentially with $\Delta T$ [15]. Thus, it is very different to meet the three conditions at the same time (large volume, low temperature, and extended period of time).

Consequently, to the best knowledge of the inventors, long-term (>1 week), large-volume (>1 ml), and deep supercooling (DSC, $\Delta T > 10°$ C.) of water has not yet been achieved [16-18], particularly for biological sample preservation purpose. For example, Berendsen et al describes a method of supercooling liver at around −6° C. for only up to 4 days (Berendsen, Tim A., et al. "Successful Supercooled Liver Storage for 4 Days." Nature medicine 20.7 (2014): 790). Usta et al. describes a method of supercooling rat hepatocytes in about 10 ml solution at a range of preservation temperatures (−4 to −10° C.) for about 7 days (Usta, O. Berk, et al. "Supercooling as a viable non-freezing cell preservation method of rat hepatocytes." PloS one 8.7 (2013): e69334). And the most widely used protocol for red blood cell storage can store red blood cells at about 4° C. for only up to 42 days (D'Alessandro et al. "Red blood cell storage: the story so far." Blood Transfusion 8.2 (2010): 82.).

In order to address the limitations of the existing methods and provide a supercooling method that can supercool large-volumes of water for extended periods of time (e.g., at least 5, 6, 7, 8, 9, 10 11, 12, 13, 14, 20, 30, 40, 50, 100, 200, 300 days, and up to, e.g., 30, 60, 90, 180, 200, 300, 400, 500 days or more) at a relatively low temperature (e.g., less than −10° C.), this disclosure provides a new approach. This disclosure demonstrates that with this approach, it is possible to meet the three goals simultaneously, i.e., deep supercooling, large-volumes of water, and extended periods of time. The breakthrough in achieving the combined goals is the prerequisite in many areas of science, research, and technology development, especially for the biopreservation of cells, tissues and organs via supercooling [19].

Ice Nucleation Mechanisms

Figures 5A, 5B:
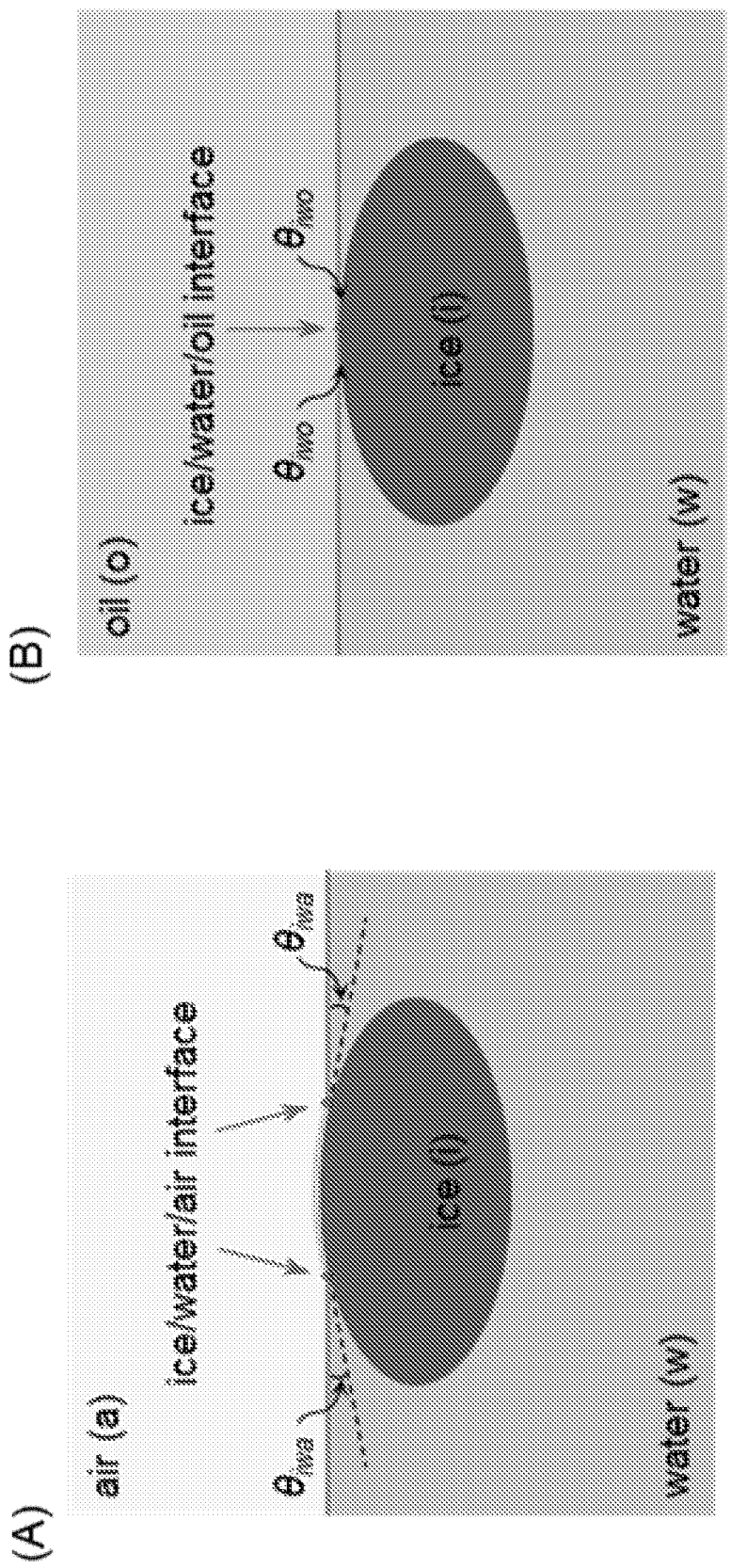
FIG. 5A. Schematics for ice/water/air contacts. $θ_{iwa}$ is water contact angles on ice/water/air interfaces.
FIG. 5B. Schematics for ice/water/oil contacts. $θ_{iwo}$ is water contact angles on ice/water/oil interfaces.

There are two general ice nucleation mechanisms, homogenous and heterogeneous crystallization. Homogeneous crystallization occurs due to random aggregation of interior water molecules to create a critically large nucleus of ice crystal, which could only be achieved and observed below −20° C. [20]. Heterogeneous crystallization, on the other hand, stems from ice nucleus formation catalyzed by a substrate and/or with the aid of foreign objects at much higher temperatures [21]. Consequently, water freezing is generally initiated by heterogeneous nucleation, and especially, the water/air interface is typically the primary nucleation site as revealed in theoretical [22, 23], experimental [18, 24], and numerical [25, 26] studies. When water molecules aggregate on the water surface (water/air interface) to form an ice nucleus, they need to overcome an energy barrier $\gamma^{ia} - \gamma^{wa}$ ($\gamma$: interfacial tension, superscripts i, w, o, and a refer to ice, water, oil, and air, respectively) per unit area as the ice/air interface replaces original water/air interface. In comparison, the energy barrier for homogeneous ice nucleation within bulk water is proportional to the water/ice interfacial tension $\gamma^{wi}$. This interfacial tension can be expressed via the Young equation as $\gamma^{wi} = \gamma^{ia} - \gamma^{wa} \cos\theta_{iwa} \geq \gamma^{ia} - \gamma^{wa}$ ($\theta_{iwa}$: water contact angle on ice/water/air interface, FIG. 5A). This inequality indicates that heterogeneous ice nucleation on the surface is thermodynamically more favorable than homogeneous nucleation in bulk as complete wetting ($\theta_{iwa} = 0°$) is not generally observed [23], and receding contact angles of 12° have been reported [27]. Therefore, if the water surface was sealed by an oil phase, the energy barrier of ice nucleation at the water-oil interface would be $\gamma^{io} - \gamma^{wo}$. Similarly, the homogenous nucleation energy barrier can be now expressed in terms of another triple interface, namely the oil/water/ice as $\gamma^{wi} = \gamma^{io} - \gamma^{wo} \cos\theta_{iwo}$ where $\theta_{iwo}$, for many oils can be nearly 0° (FIG. 5B) [24, 28]. In the case of $\theta_{iwo} \cong 0$, the energy barrier approaches the limiting case $\gamma^{io} - \gamma^{wo} \cong \gamma^{wi}$. This analysis indicates that the energy barrier of heterogeneous crystallization at the surface is elevated almost to the level of homogeneous one when the water/air interface is replaced by an oil-water interface. Accordingly, surface sealing of water with an appropriate oil phase can suppress primary heterogeneous ice nucleation at the surface and enable extended storage of deeply supercooled water.

Methods of Supercooling

The present disclosure provides methods of supercooling an aqueous sample, reducing risk or probability of ice nucleation during supercooling, inhibiting nucleation during supercooling, lowering nucleation temperature (or observed freezing temperature), increasing supercooling frequency, inhibiting stochastic freezing processes, and/or decreasing freezing frequency (e.g., cumulative freezing frequency) of an aqueous sample. The methods generally involve providing a container comprising the aqueous sample; applying an immiscible liquid phase; and cooling the aqueous sample to a temperature that is below 0° C. In some embodiments, the aqueous sample or aqueous fluid is sealed by the immiscible liquid phase. In some embodiments, the aqueous sample is an aqueous solution or an aqueous suspension. The biological samples can be suspended or submerged in the aqueous sample.

The immiscible liquid phase can be any liquid substance that will not form a homogenous solution with water. The immiscible liquid phase typically has sufficient thickness to separate the aqueous sample from air (e.g., ambient air). As used herein, the term "ambient air" refers to air from the environment, not the air bubbles emerged from the air dissolved in water during the supercooling or storage period.

In some embodiments, the immiscible liquid phase has a smaller density than the aqueous sample (e.g., the aqueous solution or the aqueous suspension). Thus, the water-immiscible liquid phase can seal the aqueous samples and eliminates the aqueous sample (liquid)-air interfaces, which is the primary site for nucleation. In some embodiments, the immiscible liquid phase can comprise or consist of insoluble inorganic or organic molecules (e.g., oils, organic solvents, hydrocarbons, carbohydrates, or derivatives thereof). In some embodiments, the immiscible liquid phase can have one or more, or a mixture, of the following:

(a) Alkanes, including e.g., linear, branched and cyclic alkanes. Some exemplary alkanes include, e.g., pentane ($C_5H_{12}$), hexane ($C_6H_{14}$), heptane ($C_7H_{16}$), octane ($C_8H_{18}$), nonane ($C_9H_{20}$), decane ($C_{10}H_{22}$), undecane ($C_{11}H_{24}$), etc.;

(b) Alkenes, including e.g., linear, branched and cyclic alkenes. Some exemplary alkenes include, e.g., pentene ($C_5H_{10}$), hexene ($C_6H_{12}$), heptene ($C_7H_{14}$), octene ($C_8H_{16}$), nonene ($C_9H_{18}$), decene ($C_{10}H_{20}$), undecene ($C_{11}H_{22}$) and dodecene, etc. ($C_{12}H_{24}$);

(c) Alkynes, including e.g., linear, branched and cyclic alkynes. Some exemplary alkynes include, e.g., pentyne ($C_5H_8$), hexyne ($C_6H_{10}$), heptyne ($C_7H_{12}$) and octyne ($C_8H_{14}$);

(d) Benzene and its derivatives thereof;

(e) Alcohols, including e.g., linear, branched and cyclic alcohols. Some exemplary alcohols include, e.g., primary alcohols. In some embodiments, the alcohols are butanol ($C_4H_9OH$), pentanol ($C_5H_{11}OH$), hexanol ($C_6H_{13}OH$), heptanol ($C_7H_{15}OH$), and octanol ($C_8H_{17}OH$);

(f) Alkanoic acids, including e.g., linear, branched and cyclic alkanoic acids. Some exemplary alkanoic acids include, e.g., pentanoic acid ($C_4H_9COOH$);

(g) Aldehydes, including e.g., linear, branched and cyclic aldehydes. Some exemplary aldehydes include, e.g., butanal ($C_3H_7CHO$), pentanal ($C_4H_9CHO$), hexanal ($C_5H_{11}CHO$) and heptanal ($C_6H_{13}CHO$);

(h) Ketones, including e.g., linear, branched and cyclic ketones. Some exemplary ketones include, e.g., hexanone ($C_5H_{12}CO$), pentanone ($C_6H_{14}CO$), octanone ($C_7H_{16}CO$), and nonanone ($C_8H_{18}CO$);

(i) Esters, including e.g., linear, branched and cyclic esters;

(j) Polydimethylsiloxane (PDMS) based compounds, with or without functional groups, such as hydroxy group (—OH), carbonyl group (—CO—), aldyhyde group (—CHO), ester group (—COO—), and carboxyl group (—COOH);

(k) Oils, e.g., mineral oil, paraffin oil, olive oil, nutmeg oil, and a mixture thereof.

In some embodiments, the immiscible liquid phase can have 1, 2, 3, 4, 5, 6, 7, 8, 9, 10, or more different agents or compounds as described herein.

Furthermore, partly based on the experiments described herein, some agents are not appropriate to be used as sealing agents (e.g., should not be used in the immiscible liquid phase). Usually, the sealing agent cannot be gaseous or frozen before and during supercooling. In addition, the sealing agent should not trigger heterogeneous ice nucleation in the oil-aqueous interface. Thus, in some embodiments, the sealing agent is not one of the following, or the immiscible liquid phase does not contain one of the following:

(1) Highly miscible oil phase with water. These agents include, e.g., methanol ($CH_3OH$), ethanol ($C_2H_5OH$), propanol ($C_3H_7OH$), acetic acid ($CH_3COOH$) propanoic acid ($C_2H_5COOH$), butanoic acid ($C_3H_7COOH$), acetone ($C_2H_6CO$), butanone ($C_3H_8CO$), pentanone ($C_4H_{10}CO$), ethanal ($CH_3CHO$), and propanal ($C_2H_5CHO$);

(2) Oil phase that can freeze at supercooling temperatures. These agents include, e.g., dodecane ($C_{12}H_{26}$) and primary nonanol ($C_9H_{19}OH$).

(3) Any oil phases that closely matches lattic dimension and structures of ice crystals at the oil-water interface and hence can initiate nucleation. For example, the polydimethylsiloxane (PDMS) with viscosity of 3.5 Pa·S. Other examples include primary alchols with long chain length ($C_{29}$-$C_{31}$).

Thus, in some embodiments, the immiscible liquid phase comprises or consists of vegetable oil, mineral oil, paraffin oil, olive oil, nutmeg oil, or a mixture thereof. In some embodiments, the immiscible liquid phase comprises or consists of one or more compounds selected from the group consisting of alkanes, alkenes, alkynes, benzenes, alcohols, alkanoic acids, aldehydes, ketones, esters, polydimethylsiloxane (PDMS), and derivatives thereof.

In some embodiments, the immiscible liquid phase comprises or consists of a primary alcohol. In some embodiments, the primary alcohol is 1-pentanol ($CH_3(CH_2)_3CH_2OH$) or 1-hexanol ($CH_3(CH_2)_4CH_2OH$). In some embodiments, the immiscible liquid phase comprises or consists of alkanes, e.g., undecane ($CH_3(CH_2)_9CH_3$).

The aqueous sample can have various volumes, e.g., can have a volume of greater than 0.1 ml, 1 ml, 10 ml, 100 ml, 1000 ml, or 10,000 ml. In some embodiments, the aqueous sample has a volume of less than 1000 ml, 10,000 ml, or 100,000 ml.

The cooling rate for supercooling can also vary. In some embodiments, the cooling can be at a rate of <50° C./minute, e.g., <20° C./minute, <10° C./minute, <9° C./minute, <8° C./minute, <7° C./minute, <6° C./minute, <5° C./minute, <4° C./minute, <3° C./minute, <2° C./minute, <1° C./minute, <0.9° C./minute, <0.8° C./minute, <0.7° C./minute, <0.6° C./minute, <0.5° C./minute, <0.4° C./minute, <0.3° C./minute, <0.2° C./minute, <0.1° C./minute, In some embodiments, the methods as described herein can supercool the aqueous sample to a temperature that is below −4° C., e.g., below −5° C., −6° C., −7° C., −8° C., −9° C., −10° C., −11° C., −12° C., −13° C., −14° C., −15° C., −16° C., −17° C., −18° C., −19° C., −20° C., −21° C., −22° C., −23° C., −24° C., −25° C., −26° C., −27° C., −28° C., −29° C., −30° C., −31° C., −32° C., −33° C., −34° C., −35° C., −36° C., −37° C., −38° C., −39° C., −40° C., −41° C., −42° C., −43° C., −44° C., −45° C., −46° C., −47° C., or −48° C. In some embodiments, the observed freezing temperature is below −20° C., e.g., below −21° C., −22° C., −23° C., −24° C., −25° C., −26° C., −27° C., −28° C., −29° C., −30° C., −31° C., −32° C., −33° C., −34° C., −35° C., −36° C., −37° C., −38° C., −39° C., −40° C., −41° C., −42° C., −43° C., −44° C., −45° C., −46° C., −47° C., or −48° C. In some embodiments, the observed freezing temperature is above −20° C., e.g., above −21° C., −22° C., −23° C., −24° C., −25° C., −26° C., −27° C., −28° C., −29° C., −30° C., −31° C., −32° C., −33° C., −34° C., −35° C., −36° C., −37° C., −38° C., −39° C., −40° C., −41° C., −42° C., −43° C., −44° C., −45° C., −46° C., −47° C., or −48° C.

The methods as described herein can maintain the supercooling status of the aqueous sample for various time periods, for example, for more than 7 days, e.g., more than 10 days, 20 days, 30 days, 40 days, 50 days, 60 days, 70 days, 80 days, 90 days, 100 days, 150 days, 200 days, 300 days, 1 year, 2 years, 5 years, or even longer. In some embodiments, the supercooling status can be maintained for up to 50 days, 60 days, 70 days, 80 days, 90 days, 100 days, 150 days, 200 days, 300 days, 1 year, 2 years, 5 years, 10 years, or more. In fact, the aqueous sample is very stable, and in some embodiments, the supercooling state of the aqueous sample can be maintained indefinitely as longs as the equipment allows.

In some embodiments, the cumulative freezing frequency (ff) of the aqueous sample during the storage period is less than 90%, e.g., less than 80%, 70%, 60%, 50%, 40%, 30%, 20%, 10%, 5%, or 1%.

As it is described herein, it is very difficult to achieve deep supercooling (DSC, $\Delta T>10°$ C.) of large volumes of water with (e.g., >1 ml) for long-term (e.g., >1 week), and to the best knowledge of the inventors, supercooling that satisfies the three conditions (e.g., $\Delta T>10°$ C., >1 ml, >1 week) at the same time has not been successfully practiced before, at least for biopreservation purposes (e.g., using biological samples). The methods as described herein can meet the three conditions at the same time, as it can provide deep supercooling ($T_f<-11°$ C., e.g., $<-12°$ C., $-13°$ C., $-14°$ C., $-15°$ C., $-16°$ C., $-17°$ C., $-18°$ C., $-19°$ C., $-20°$ C., $-21°$ C., $-22°$ C., $-23°$ C., $-24°$ C., or $-25°$ C.) of the aqueous sample with large-volume (e.g., >1 ml, 10 ml, 100 ml, 1000 ml, or 10,000 ml) for a long-term (e.g., >7 days, 10 days, 20 days, 30 days, 40 days, 50 days, 60 days, 70 days, 80 days, 90 days, 100 days).

Further, the supercooled aqueous sample can be resistant to various disturbances, e.g., vibrational, thermal, and ultrasonic disturbances. Without wishing to be bound by theory, it has been hypothesized that the sealing liquid phase can also help dissipate mechanical (or other) perturbations. In some embodiments, the supercooled aqueous sample can maintain its supercooled status (e.g., without ice nucleation formation) in the presence of vibration or acceleration disturbance (e.g., more than 0.1 g, 0.5 g, 1 g, 2 g, 3 g, 4 g, or 5 g). In some embodiments, the supercooled aqueous sample can maintain its supercooled status in the presence of ultrasonic disturbances (e.g., with local pressure greater than 1 GPa, 2 GPa, 3 GPa, or 5 GPa). In some embodiments, the supercooled aqueous sample does not freeze (or trigger ice nucleation formation) when it is exposed to thermal disturbances (e.g., being exposed to gas or liquid with temperature equal to or higher than 0° C., 10° C., 20° C., 30° C., 37° C., 40° C., or 50° C.).

Preserving Biologic Samples, Organs, or Organisms

It is generally believed that uncontrolled ice nucleation destroys cellular structures (e.g., intracellular structures). Minimization of injury during cryopreservation can be achieved when ice nucleation is minimized.

The disclosure provides methods of preserving a biological sample. The biological sample can be suspended or submerged in the aqueous sample. As used herein, a biological sample can be or include an organism (e.g., eukaryotic or prokaryotic organisms), a cell, a tissue sample, an organ, blood (e.g., whole blood), oncosomes, exosomes, microvesicles, or liposomes. The biological sample can also contain macromolecules and macromolecular complexes such as nucleic acids (e.g., DNA, RNA, PNA, LNA, mRNA, or microRNA), proteins, and/or lipids, and combinations thereof (e.g., protein/DNA or protein/RNA complexes).

In some embodiments, the biological samples can include eukaryotic, e.g., mammalian, cells. The methods described herein can be used for the preservation of any type and any species of mammalian cells. For example, the methods can be used to supercool oocytes or sperm in assisted reproductive technology or for patients undergoing chemotherapy or radiation therapy. The methods can also be used for supercooling of stem cells, such as embryonic stem cells, or other cells, which can then be used as the basis of stem cell-based therapies, cell transplantation, tissue engineering, and regenerative medicine. The methods can also be used to supercool oocytes or sperm from an animal that is rare or at risk of becoming extinct for future use in assisted reproductive technologies for the preservation of the species. The methods can further be used for animal husbandry purposes (e.g., the breeding and raising of animals), for example, for the preservation of embryonic stem cells, gametocytes, oocytes, or sperm from animals such as cows, pigs, and sheep.

Cell types that may be supercooled using the methods of the present disclosure include, for example, differentiated cells, such as epithelial cells, cardiomyocytes, neural cells, epidermal cells, keratinocytes, hematopoietic cells, melanocytes, chondrocytes, B-cells, T-cells, erythrocytes, macrophages, monocytes, fibroblasts, lymphocytes, or muscle cells; and undifferentiated cells, such as embryonic, mesenchymal, or adult stem cells. Additional cell types that can be supercooled using the methods of the disclosure include gametocytes, oocytes, sperm, zygotes, and embryos. Other cells include those from the bladder, brain, esophagus, fallopian tube, heart, intestines, gallbladder, kidney, liver, lung, ovaries, pancreas, prostate, spinal cord, spleen, stomach, testes, thymus, thyroid, trachea, ureter, urethra, or uterus.

The cells may be from a human or non-human mammal, for example Cercopithecoidea family, Hominoidea superfamily, *Canis familiaris, Felis catus*, Cricetidae spp., *Equus* spp. (e.g., *Equus caballus, Equus assinns*), Equidae family, *Bos taurus, Bos indicus*, Bovidae family, Camelidae family, *Bubalus bubalis, Capra aegagrus hircus*, Cervidae family, Cervinae family, *Ovis aries, Ovis canadensis, Capra hircus, Sus scrofa domestica, Mesocricetus* spp., *Mustela vison, Cavia porcellus, Meriones unguiculatus, Chinchilla laniger, Rattus norvegicus, Rattus* spp., *Mus musculus*, Leporidae family, *Oryctolagus cuniculus, Kobus* spp., *Gallus* spp., *Meleagria gallopavo*, Anatidae spp., *Mustela putorius, Columba domestica, Columba livia, Numida meleagris, Ornithorhynchus anatinus, Pavo cristatus, Bison* spp., *Struthio* spp., *Lama glama, Rhea* spp., *Dromiceius* spp., *Lama pacos, Rangifer tarandus, Bos grunniens, Camelus bactrianus, Camelus dromedarius*, and any endangered or threatened species (e.g., those species identified by the U.S. Fish and Wildlife Service (USFWS) Threatened and Endangered Species System (TESS)).

The disclosure also provides methods of preserving an organ. The methods can include the steps of perfusing, contacting, or immersing the organ with the aqueous sample as described herein, and supercooling the organ in the aqueous sample. Methods of perfusing an organ are known in the art. For example, perfusion can be performed by pouring over or through the arteries or veins of the organ. In some embodiments, a perfusion device (e.g., a pump or injector) can be used. Alternatively or in addition, the organ can be immersed within the aqueous sample. The organ can be any organ of a eukaryote, e.g., of a mammal, e.g., a heart, lung, kidney, spleen, pancreas, or liver etc. Furthermore, during static cold storage of organs, many harmful processes can contribute to short preservation times including ATP depletion, calcium overload, production of reactive oxygen species, cytoskeleton disruption, and cellular acidosis, all of which are magnified by ischemia-reperfusion injury following storage. $D_2O$ has been shown to inhibit cytosolic calcium, improve microtubule stability, stabilize membranes and proteins, thus, in some embodiments, the aqueous sample described herein can also include $D_2O$, thereby minimizing ischemia-reperfusion damage.

The disclosure also provides methods of preserving an organism. The methods include the steps of contacting, or immersing the organism with the aqueous sample as described herein, and supercooling the organism with the aqueous sample. The organism can be, e.g., viruses, bacteria, fungi, invertebrates (e.g., insects), fish, or reptiles.

In some embodiments, the biological sample is an agricultural product (e.g., food, vegetables, meat, fish, rice). The methods as described herein can maintain the freshness of the agricultural product.

The methods as described herein can also improve the outcome (e.g., viability) of preservation of biological samples. The cells, organs, or organisms are prepared for preservation using techniques known in the art and described herein. In some embodiments, the cells (e.g., the mammalian cells), organs, or organisms are obtained using art known techniques and maintained in media appropriate for the biological samples.

The concentration of the cells in the aqueous sample can also vary depending on the cell type. For example, for oocytes, the concentration of cells can be low, for example, as low as <1 cell/ml, while for stem cells, the cell concentration can be higher than $10^6$/ml. The exact concentration can be determined by the skilled artisan for the particular cell type. In some embodiments, the aqueous sample can have more than about 1 million, 10 million, 50 million, 100 million, 500 million, or 1000 million cells.

The aqueous sample can also include a cold storage solution. Examples of cold storage solution include, e.g., Celsior™ solution, Perfadex™ solution, Collins solution, citrate solution, tissue culture media (e.g., Dulbecco's Modified Eagle's Medium (DMEM)), the Histidine-tryptophan-ketoglutarate (HTK) solution, and the University of Wisconsin (UW) solution (Oxford Textbook of Surgery, Morris and Malt, Eds., Oxford University Press, 1994). The University of Wisconsin (UW) cold storage solution is considered the current golden standard solution for organ transplantation. It includes the following: 100 mM potassium lactobionate, 25 mM $KH_2PO_4$, 5 mM $MgSO_4$, 30 mM raffinose, 5 mM adenosine, 3 mM glutathione, 1 mM allopurinol, and 50 g/L hydroxyethyl starch.

The aqueous sample can also include any physiologic solution such as phosphate buffered saline (PBS) (e.g., 1×PBS), HIM (a flush hold Hepes-buffered medium from Specialty Media, Lavallette, NJ), or a cell media, for example, a stem cell culture medium that includes Knockout DMEM+15% Knockout Serum Replacement (Invitrogen, Carlsbad, CA) containing 1000 U/ml Leukemia Inhibitory Factor (Chemicon, Temecula, CA). The aqueous sample can be supplemented with one or more components including, but not limited to, serum, proteins, penicillin/streptomycin, lipids, salts, formamide, methoxylated compounds, polymers (e.g., polyvinyl pyrrolidone and polyvinyl alcohol), cryoprotectants, and/or sugars.

In some embodiments, the aqueous sample comprises or consists of one or more of the following: University of Wisconsin cold storage solution, polyethylene glycol (PEG), trehalose, and 3-O-methyl glucose (3-OMG). In some embodiments, the aqueous sample has UW cold storage solution with PEG (e.g., 5% 35 kda PEG). In some embodiments, the aqueous sample has UW cold storage solution, PEG (e.g., about 1%, 2%, 3%, 4%, 5%, 10% (w/v) of 35 Kda PEG), and 3-OMG (e.g., about 0.1 M, 0.2 M, 0.3 M, 0.4 M, 0.5 M). In some embodiments, the aqueous sample has UW cold storage solution and trehalose (e.g., about 1%, 2%, 3%, 4%, 5%, 10% (w/v) of trehalose).

In some embodiments, the aqueous sample further comprises anti-nucleation agents, freezing point depressors, and/or cryoprotectants.

In some embodiments, the aqueous sample does not have any anti-nucleation agents, freezing point depressors, cryoprotectants, or any agents and compounds as described herein.

Anti-Nucleation Agents

Anti-nucleation agents (ice blockers) can also be included in the aqueous sample. Non-limiting examples of ice blockers include polymers and peptides having properties that inhibit ice nucleation and growth within the medium or similar polymers and peptides thereto. Examples of such polymers and peptides may include, but are not limited to, polyvinyl alcohol, polyglycerol, antifreeze proteins, and other polymer and peptides referred to in the art as ice blockers. These anti-nucleation agents or ice blockers are known in the art, and are described e.g., in US 20090305224, US 20130260452, U.S. Pat. Nos. 8,771,733, 8,679,735, US20020063235, each of which is incorporated by reference in its entirety.

Cryoprotectants

The aqueous sample as described herein can also include one, two, or more than two cryoprotectants or cryoprotective agents (CPAs). As used herein, the term "cryoprotectant" or "cryoprotective agent" refers to a substance that prevents or reduce damage to cells during supercooling. Various cryoprotectants can be included in the aqueous sample as described in the present disclosure. These cryoprotectants include, e.g., sugar, polypropylene glycol, dimethylsulfoxide (DMSO), dextran, glycerol, sorbitol, propylene glycol, ethylene glycol, pyridine, 2-3 butane diol, hydroxyethyl starch, polyvinylpyrrolidone (PVP), proline (or other protein stabilizers), human serum albumin and combinations thereof. The sugar can also be any one of the following, e.g., sucrose, trehalose, raffinose, stachyose, fructose, and dextran. Exemplary sugars and the concentration ranges for such sugars are described in U.S. Pat. Nos. 6,673,607 and 7,094,601, herein incorporated by reference.

The cryoprotectant can be either membrane-permeable or non-permeable. The permeable cryoprotectants include, e.g., DMSO, alcohol such as ethylene glycol (EG), PROH (propylene glycol, propane-1,2-diol, or 1,2-propanediol), glycerol, and saccharide derivatives such as 3-O-methyl-glucose (3-OMG). The non-permeable cryoprotectants include, e.g., saccharides such as fructose, trehalose, sucrose, sorbitol, or raffinose, polymers such as hydroxyethyl starch (HES) or polyvinylpyrrolidone (PVP), amino acids such as L-proline, and biological macromolecules such as human serum albumin, and any combinations thereof. In some embodiments, the cryoprotectant is sucrose, trehalose, stachyose, raffinose, or polymers (e.g. PEG, PVA, HES). In some embodiments, the composition includes 3-OMG, Trehalose, N-acetyl-L-cysteine, and/or hydrogen sulfide.

The cryoprotectant can have various concentrations (w/v), e.g., 1%, 2%, 3%, 4%, 5%, 10%, 15%, 20%, 25%, 30%, 35%, 40%, or 50%. As used herein, the "weight/volume (w/v) concentration" or "weight/volume (w/v) percentage" refers to the weight (in grams) of solute dissolved in a final volume of 100 mL of solution. For example, the concentration 1% (w/v) refers to a solution with 1 g of solute dissolved in a final volume of 100 mL of solution. In some embodiments, the concentration (w/v) can be greater than 1%, 2%, 3%, 4%, 5%, 10%, 15%, 20%, 25%, 30%, 35%, 40%, or 50%. In some embodiments, the concentration (w/v) can be less than 1%, 2%, 3%, 4%, 5%, 10%, 15%, 20%, 25%, 30%, 35%, 40%, or 50%. For example, the concentrations (w/v) for the cryoprotectants (e.g., DMSO, EG, PROH, glycerol, propylene glycol, pyridine, 2-3 butane diol, or human serum albumin) can be 1%, 2%, 3%, 4%, 5%, 10%, 15%, 20%, 25%, 30%, 35%, or 40%. In some embodiments, the concentration (w/v) for the cryoprotectants is less than 40%.

The concentration of a solute can also be expressed as a weight percentage (w/w). The concentration 1% (w/w) refers to a solution with 1 g of solute dissolved in a 100 g of the final solution (including both the solute and the solvent). In some embodiments, the concentration (w/w) of a cryoprotectant can be greater than 1%, 2%, 3%, 4%, 5%, 10%, 15%, 20%, 25%, 30%, 35%, 40%, or 50%. In some embodiments, the concentration (w/w) can be less than 1%, 2%, 3%, 4%, 5%, 10%, 15%, 20%, 25%, 30%, 35%, 40%, or 50%. For example, the concentration (w/w) for the cryoprotectants (e.g., PVP) can be less than 5%, e.g., 1%, 2%, 3%, 4%, or 5%.

The amount of a solute in a solution can also be expressed in molar concentration. A commonly used unit for molar concentration is the molar (M) which is defined as the number of moles per liter. In some embodiments, the concentration of a cryoprotectant can be higher than 50 mM, 100 mM, 200 mM, 300 mM, 400 mM, 500 mM, 600 mM, 700 mM, 800 mM, 900 mM, 1 M, 2M, 3M, or 4M. In some embodiments, the concentration of a cryoprotectant can be less than 50 mM, 100 mM, 200 mM, 300 mM, 400 mM, 500 mM, 600 mM, 700 mM, 800 mM, 900 mM, 1 M, 2M, 3M, or 4M. For example, the concentration of a cryoprotectant (e.g., sucrose, sorbitol, fructose, trehalose, raffinose, hydroxyethyl starch, 3-OMG) can be equal to or less than 2M, e.g., 100 mM, 200 mM, 300 mM, 400 mM, 500 mM, 600 mM, 700 mM, 800 mM, 900 mM, or 1 M. The concentration of a cryoprotectant (e.g., proline) can be equal to or less than 300 mM, e.g., 100 mM, 200 mM, or 300 mM.

Cryoprotectants can be added to the aqueous sample as described herein as a single agent or as a combination of one or more agents. For example, 2M ethylene glycol or 1,2-propanediol (PROH) can be supplemented with 0.5 to 2M sugar to produce a synergistic effect. For example, a combination of ethylene glycol and a sugar or a combination of PROH and a sugar can be used. In one example, 2M PROH and 0.5 M trehalose are added to the composition. In another example, 0.3M sucrose and 1.5M PROH is used. The combination of a permeating and non-permeating cryoprotectant allows for a lower intracellular concentration of cryoprotectant, since the non-permeating cryoprotectant does not enter the cell. For example, in the 2M PROH and 0.5 M trehalose example described above, the intracellular concentration of cryoprotectant would be 2M since trehalose is not permeable to the plasma membrane of mammalian cells.

Viability of Cryopreserved Biological Samples

When desired, the cryopreserved biological samples of the disclosure can be warmed, using methods known in the art or described herein. Thus, the methods can further include the step of heating or warming the biological samples (e.g., cells, organs, or organisms).

The biological samples can be warmed or heated using any number of techniques known in the art, for example, by plunging the container (e.g., a tube) into a 1×PBS solution at 20-37° C., for example at room temperature, optionally with shaking and optionally supplemented with sugar or other CPAs. After warming, the biological samples (e.g., cells) are generally washed and treated as needed for the research or clinical applications. In some embodiments, the heating rate can be a rate of equal to or greater than 100° C./minute, 50° C./minute, 10° C./minute, 9° C./minute, 8° C./minute, 7° C./minute, 6° C./minute, 5° C./minute, 4° C./minute, 3° C./minute, 2° C./minute, or 1° C./minute.

There are various tests known in the art to determine the viability and function of the biological samples (e.g., cells) after warming and these tests are dependent on the types of biological samples. For example, for ES cells that are to be used for cell-based therapeutics, maintenance of pluripotency is very important. The pluripotency of the ES cells can be tested using art known methods, including, for example, Oct4-GFP expression, elevated alkaline phosphatase expression, and SSEA-I surface glycoprotein expression. The ability of cells to attach efficiently is another assay for the viability and usability of many cells. Attachment assays are known in the art and described herein. In some embodiments, more than 10%, 20%, 30%, 40%, 50%, 60%, 70%, 80%, 90%, or 95% of cells are viable (e.g., alive, and/or have normal cellular functions) after cryopreservation. In some embodiments, more than 10%, 20%, 30%, 40%, 50%, 60%, 70%, 80%, 90%, or 95% of cells can attach to the culture dish after cryopreservation.

Proliferation assays can also be used to determine if the attached cells can proliferate as expected after cryopreservation. Attachment and proliferation efficiency can be compared to control cells, which have not undergone cryopreservation. For cryopreservation of zygotes, cleavage rates can be determined after cryopreservation and compared to control groups to determine if there has been any cellular damage during the cryopreservation process. The viability of cells (e.g., red blood cells, or oocytes) can be determined by examination of the morphological characteristics of the cells following cryopreservation. In some embodiments, more than 10%, 20%, 30%, 40%, 50%, 60%, 70%, 80%, 90%, or 95% of cells have normal morphology after cryopreservation.

The assays for testing the viability, function, and usability of biological samples can also be used to test parameters for the cryopreservation methods described herein. For example, variations in the compositions (e.g., different cryoprotectants or cryoprotectant concentrations) can readily be tested on cells, and their effects on the viability, function, and usability of biological samples can be tested using any of the methods described herein or known in the art.

In the case of red blood cells, in some embodiments, the hemoglobin recovery rate can be used. In some embodiments, the hemoglobin recovery rate can be more than 10%, 20%, 30%, 40%, 50%, 60%, 70%, 80%, 90%, or 95% after cryopreservation by the methods as describe herein.

Binary Alkane/Alcohol Mixtures

Alcohols in alkane rich binary mixtures form heterogenous microdomains as opposed to a segregated monolayer, thus the combination of alkane and alcohol cannot further improve the supercooling effects. Thus, in some embodiments, the sealing agent consists of or consists essentially of only one compound or one type of compounds (e.g., alkanes, alkenes, alkynes, benzenes, alcohols, alkanoic acids, aldehydes, ketones, esters, etc.). In some embodiments, the sealing agent does not have both alkane and alcohol, because they form cooperative hydrogen bonding, and heterogenous microdomains and interfaces. However, in some embodiments, the combination of alkane and alcohol can pump water into the mixture to produce milky emulsions on top of water. Thus, in one aspect, the present discolor provides methods of making an emulsion. The methods involve applying an immiscible liquid phase comprising an alkane and an alcohol to an aqueous sample. In some embodiments, the alcohol has a concentration of less than 10%, 9%, 8%, 7%, 6%, 5%, 4%, 3%, 2%, or 1% (v/v) in the immiscible liquid phase.

Furthermore, the disclosure also provides methods of removing a hydrophilic molecule from a sample. The methods involve applying an immiscible liquid phase comprising an alkane and an alcohol to a sample. In some embodiments, the sample is an aqueous sample.

The methods described herein can also be used to alter a solute's concentration in a solution (e.g., increasing the concertation or decreasing the concentration). The methods involve applying an immiscible liquid phase comprising an alkane and an alcohol to the solution. In some embodiments, the solution is an aqueous solution.

Cooling Systems

The present disclosure also provides freezing systems. The freezing system can include a container. The aqueous sample can be stored in a container. The container can have various shapes, e.g., round bottom, flat bottom, tubes. The container can also be e.g., a bag, a plastic vial, a glass vial, a plastic straw, a pulled straw, a capillary tube or straw, and/or a bioreactor. However, sharp corners or edges in a container may act as nucleation sites and air bubbles may also get trapped. Thus, in some embodiments, the container does not have any sharp corners or edges.

The container can also be made of various materials, e.g., polymers, plastic, glass, quartz, stainless steel, sapphire, gold, silver, copper, titanium, palladium, or platinum. In some embodiments, the container can be made of polypropylene, polystyrene, or glass.

The cooling systems can further include a cooling apparatus (e.g., refrigerator, freezer) and/or a heating apparatus for warming the biological sample.

EXAMPLES

The invention is further described in the following examples, which do not limit the scope of the invention described in the claims.

Example 1: Materials and Methods

The following materials and methods were used in the examples.

Supercooling

For all experiments in this disclosure, DNase/RNase-free distilled water (Life Technologies/Thermo-Fisher Scientific, USA) was used to minimize potential pollutants or ice-nucleating agents, except DSC trials of 100 ml water where deionized (DI) water (resistivity R=18.2 MΩ) produced by a deionizing water system (METTLER TOLEDO Thornton, USA) was used. All water containers (dishes, 96-well plates, round-bottomed tubes, and bottles, Corning, USA) were made of polystyrene, and clean and sterile before experiments. The purity of all oil phases used for water surface sealing is at least 99% as specified by the vendor (Sigma-Aldrich, USA).

The loading of water into containers was performed in a chemical hood to avoid contamination of the samples by pollutants or dust particles in the air. Water of small volume (<1 ml) was loaded into containers (dishes or 96-well plates) using clean and sterile tips (Thermo Fisher Scientific, USA) and calibrated pipets (PIPETMAN, Gilson, USA), while that of large volume (≥1 ml) was loaded into containers (round-bottomed tubes or bottles) using serological pipets (Thermo Fisher Scientific, USA) by pipette filler (Drummond Scientific, USA). As water droplets smaller than 10° μl are subject to significant evaporation during long-term deep supercooling (DSC) experiments, they were not investigated in this example. After loading water samples into the containers, oil phase was gently added onto the water surface using serological pipets, trickling down along the wall of containers to avoid splashing or trapping air bubbles at the interface. The water-laden containers (with or without sealing oil) were transferred into portable temperature controlled freezers (Engel MHD-13, Engel, USA) that were placed in 4° C. cold room to minimize temperature fluctuations, or stored in −20° C. freezer (Thermo Fisher Scientific, USA). The temperatures within these freezers were verified by Toluene-filled low-temperature thermometer (Sigma, USA).

Dissolved Air

To examine the effects of dissolved air in water on ice nucleation and water freezing, the water was vacuumed at a pressure below $10^{-4}$ atmosphere for 24 hours to extract dissolved air molecules. The degassed water was, then, gently pipetted into tubes and sealed with mineral oil (MO) for supercooling tests at −16° C. The air content of the degassed water is significantly lower than that of normal water without degassing, as no air bubbles emerge from the degassed water (second row of FIG. 6B) under vacuum. The same procedure was carried out for normal water for comparative purposes, and several big air bubbles can be observed after 3-hour degassing (first row of FIG. 6B)

Stability

To test the stability of DSC water sealed by oil phase, three types of disturbances, vibrational, thermal, and ultrasonic disturbances, were studied. For vibrational disturbance test, DSC tubes were placed on shaking plate (Labline 4625 titer shaker, Marshall Scientific, USA) with shaking speed 500 and 800 rpm for 30 seconds, which give rise to the centrifugal acceleration of 0.84 and 2.1 g (g is gravitational acceleration), respectively. To prevent heat transfer, the tubes were wrapped with thick tissue paper in tube racks, all of which had been previously cooled to −20° C. in freezer. The temperature of the DSC water would not change noticeably during experiments given the brief shaking period and thick insulation layer. For thermal disturbance test, the DSC tubes were put into 37° C. incubator (warmed by air) or plunged into 37° C. water bath (warmed by water). Therefore, DSC water would experience different warming rates and temperature gradient. For ultrasonic disturbance test, DSC tubes would be plunged into 4° C. ultrasonic water bath. The sonicator (Branson B-200, TMC Inductries, USA) generates 40 kHz ultrasonic wave with power 30 W. The freezing of the DSC water can be evidenced by the change of sample transparency (from transparent to opaque).

All data were organized and reported as the mean±standard deviation from at least three independent runs of experiments (n>3); further information on sample numbers are disclosed in figure captions. The statistical significance of mean values between two groups was determined by Microsoft Excel based on Student's two-tailed t-test, assuming equal variance. Although a p-value less than 0.05 is generally regarded as statistically significant, different ranges of p-value (NS: $0.05<p$, *: $0.005<p<0.05$, : $0.005<p<10^{-6}$, *: $p<10^{-6}$) were provided to show different degrees of significance.

Example 2: Air-Water Interface is the Primary Nucleation Site

Figure 6A:
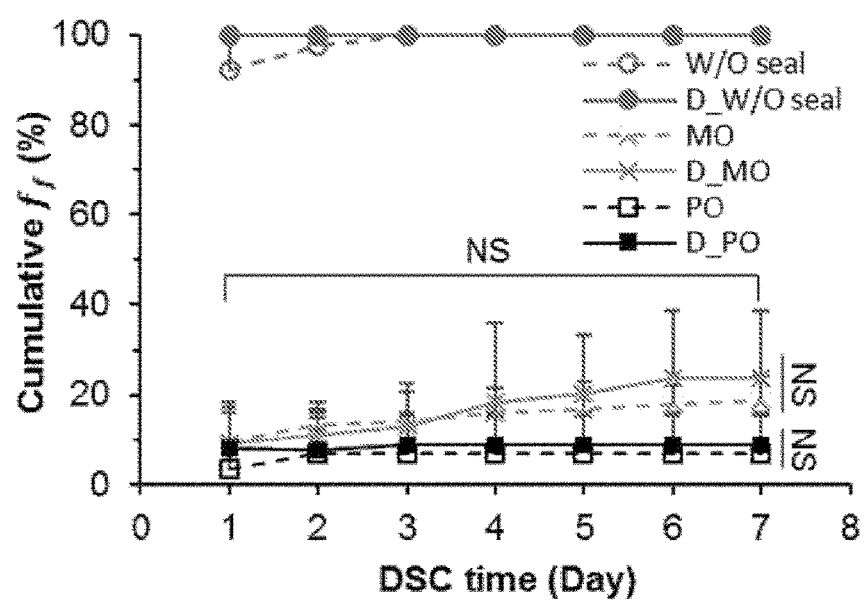
FIG. 6A. Comparison of cumulative freezing frequencies between normal and degassed DSC water at −16° C. "D_W/O seal", "D_MO", and "D_PO" represent degassed water without sealing, surface sealing with MO, and PO, respectively. n=6, N=60, NS: p>0.05.
Figure 6B:
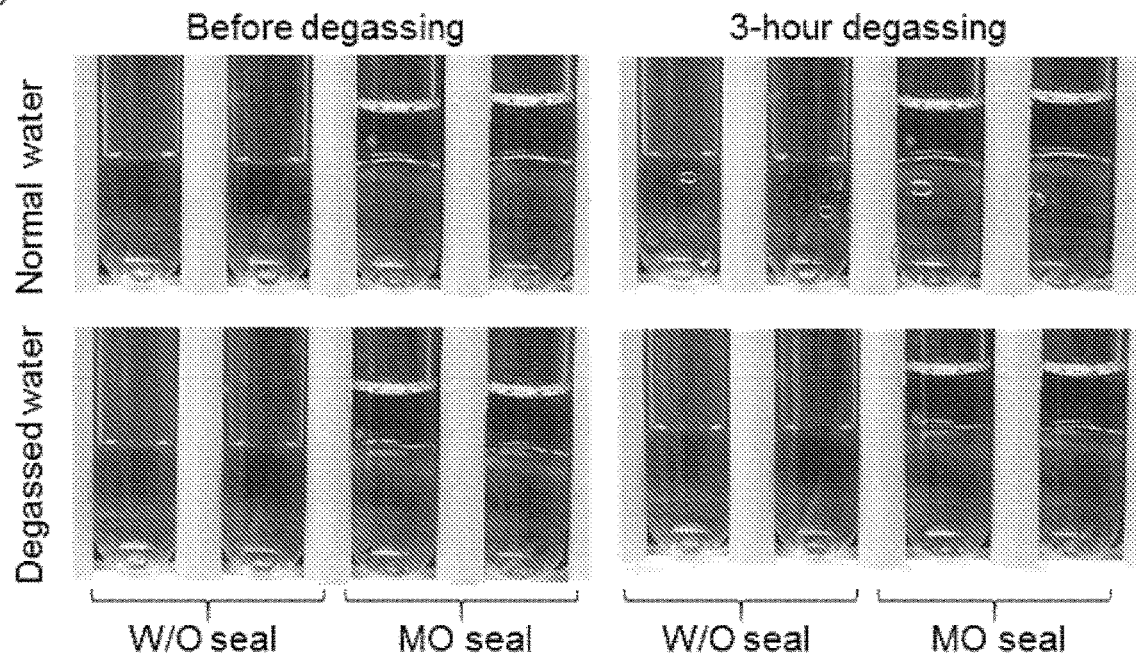
FIG. 6B. Degassing images for normal and degassed water with or without MO sealing. The dash circles indicate air bubbles precipitated under vacuum.

A large ensemble of polystyrene tubes containing 1 ml of ultra-pure water to −13° C. were cooled (FIGS. 1A-1B). This resulted in >90% of samples to be frozen after 24 hours and nearly all samples to be frozen after 5 days. In contrast, the ultra-pure water samples could be kept in the liquid phase for a week, at the same temperature, if their surfaces were sealed by various types of immiscible oils, such as light mineral oil (MO), olive oil (OO), heavy paraffin oil (PO), and nutmeg oil (NO). Interestingly, the curdling of OO during DSC does not trigger water freezing, though the cumulative freezing frequency ($f_f$, $f_f=1-f_s$) increases significantly compared to water sealed by other oils (FIG. 1A). It was also observed that the water degassed by vacuuming for 24 hours, has similar $f_f$ as normal water, with or without oil sealing (FIGS. 6A-6B). These experiments indicate that air dissolved in the water does not play a major role in ice nucleation in the experiments. Given this result and the consistent efficacy of surface sealing by different oils on freezing reduction, it is concluded that the air-water interface is the primary nucleation site.

Figure 7A:
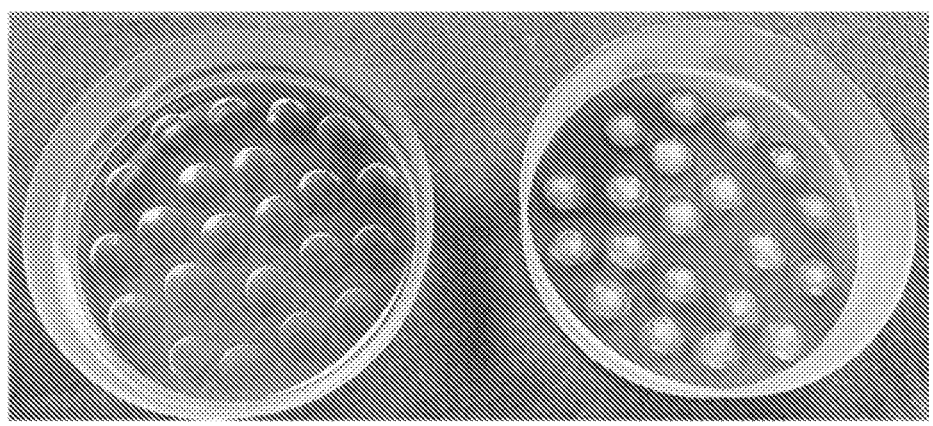
FIG. 7A. Representative images for 30 μl droplets with or without MO sealing post 1-day DSC at −16° C.
Figure 7B:
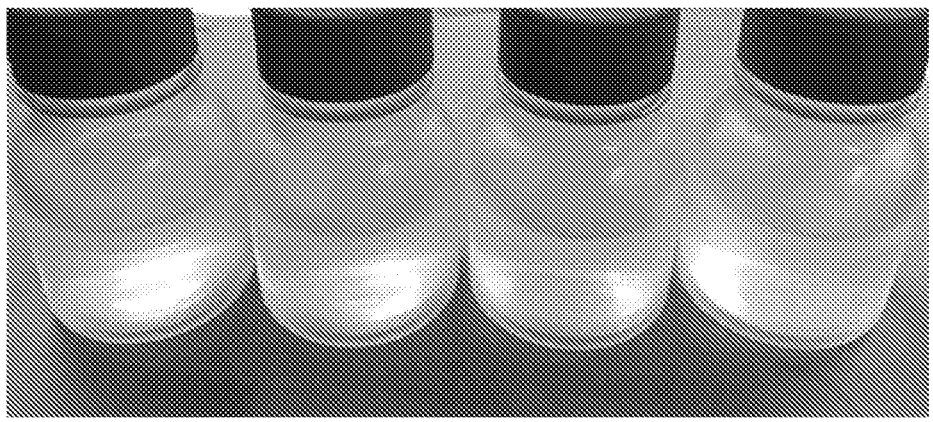
FIG. 7B. 100 ml deionized (DI) water sealed by 16 ml PO post 100-day DSC at −16° C. All possible freezing events occur before Day-3, and 8 out of total 35 (n=7, N=35) bottles of water maintain unfrozen after 100-day storage.

Experiments were performed to study the influence of water volume on the efficacy of oil sealing on freezing inhibition. The effect of the two most promising oils, MO and PO, at −13 and −16° C. for different volumes of ultra-pure water ranging from $10^0$-$10^5$ µl were studied (FIGS. 1C-1D, FIGS. 7A-7B). It was determined that MO sealing can effectively suppress water freezing for water volumes up to $10^4$ µl at −13 and −16° C. PO sealing was even more effective with a low $f_f$ throughout the entire volume range at −13° C., and only 45.8% of samples frozen at −16° C. for the $10^5$ µl samples. In addition, 8 out of 35 (22.8%) samples of $10^5$ µl water were kept in the supercooled state at −16° C. for 100 days without any freezing event after Day-3 (FIG. 7B). While further investigations might be necessary, these observations are incompatible with conventional stochastic freezing processes (SI), which implies exponential decrease of $f_s$ with time [13, 14]. Alternatively, the freezing of DSC water sealed by oil could be depicted as "case-specific" that some of sealed water samples are more susceptible to crystallization than others due to their unique and slightly different microstructures on the interface, even though all of them possess higher capability to resist freezing compared to the water without sealing.

Figures 2A, 2B, 2C:
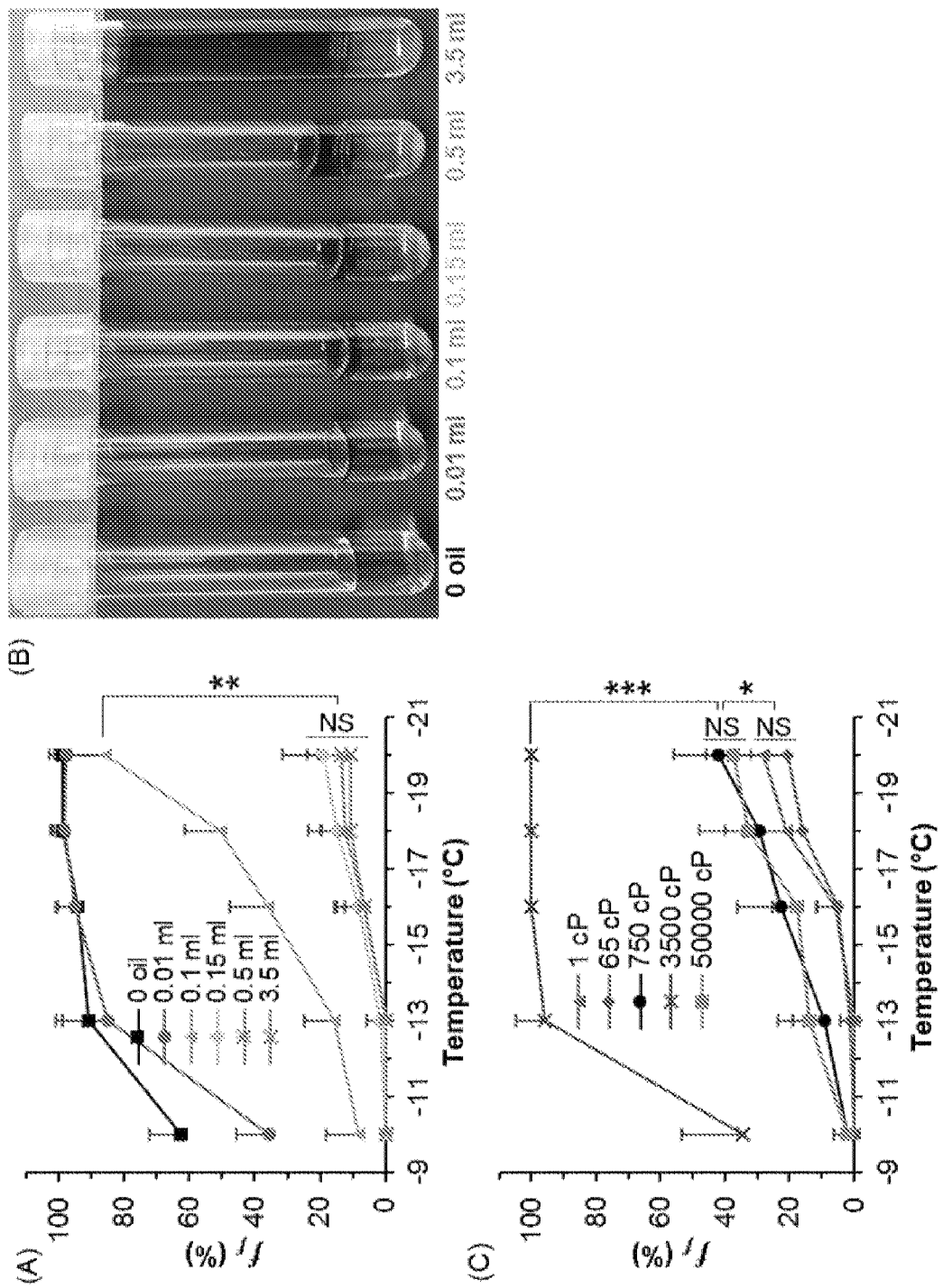
FIG. 2A. Effect of sealing oil (MO) volume on $f_f$ post 1-day DSC at different temperatures. n=6, N=70.
FIG. 2B. Side view of corresponding samples of FIG. 2A. MO includes Oil Red O for staining and imaging. 0 oil, 0.01 ml, 0.1 ml, 0.15 ml, 0.5 ml, and 3.5 ml indicate no seal, ring seal, partial seal, critical seal (just complete surface seal), standard seal, and over seal by MO, respectively.
FIG. 2C. Effect of viscosity of sealing agents on $f_f$ post 1-day DSC at −16° C. The sealing agents are hydroxy (OH) terminated polydimethylsiloxane (PDMS) of different chain lengths and viscosities. n=5, N=56.
Figure 8:
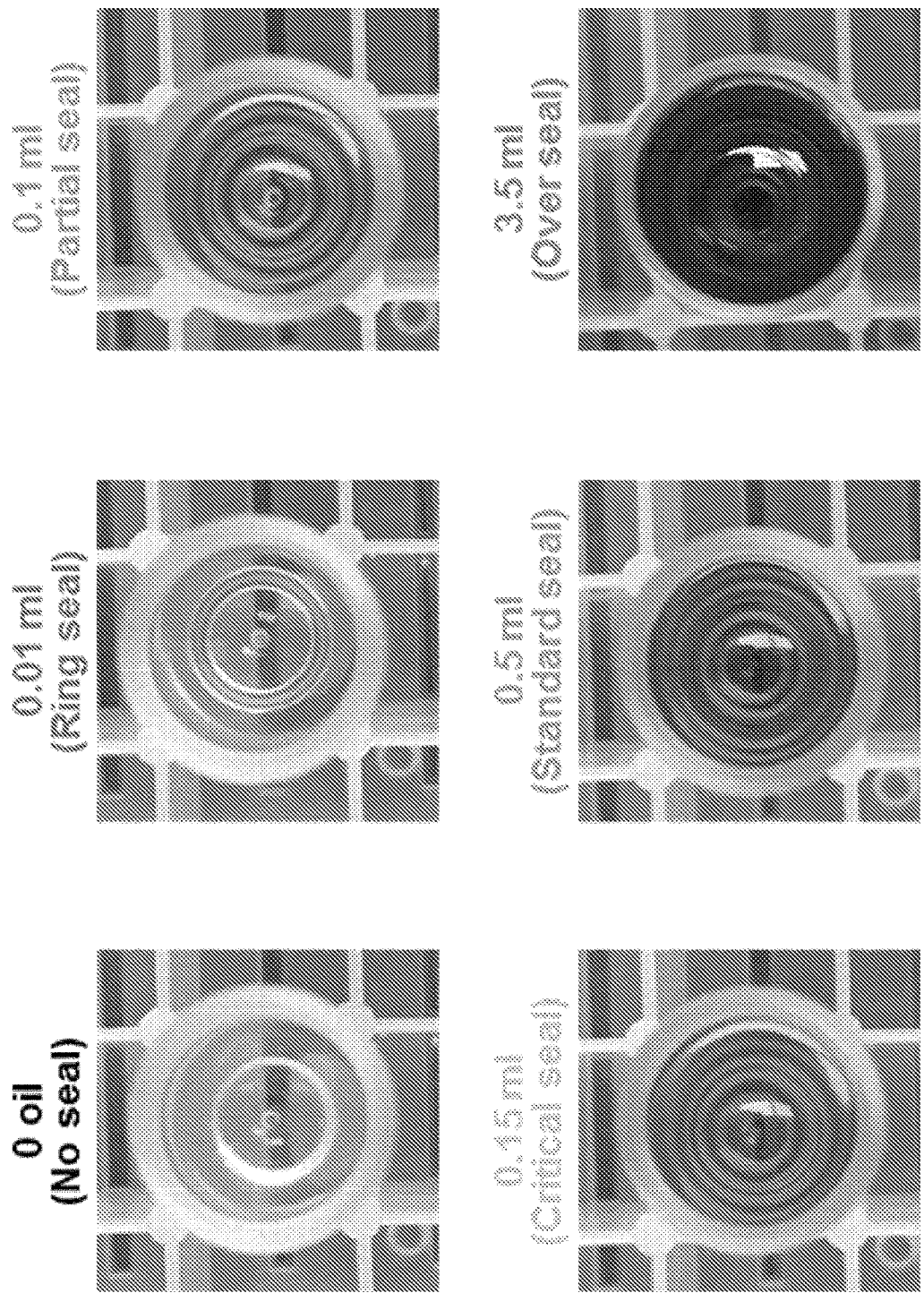
FIG. 8. Vertical view of water surface in round-bottomed tubes sealed by MO of various volumes. The oil was stained by Oil Red O for enhanced contrast. Newton's rings were observed due to the curvature of sealing oil near the tube wall.

In order to further support the hypothesis that the water/air interface plays a dominant role in ice nucleation and subsequent freezing, water freezing frequencies under differential degrees of surface sealing by MO were measured, ranging from a) unsealed (0 oil), b) ring sealed along the contact line between water and tube wall (0.01 ml), c) partially sealed with partial exposure to air (0.1 ml), d) critically sealed with water surface just completely covered (0.15 ml), e) normally sealed (0.5 ml), and f) over sealed with excessive oil mounted on water surface (3.5 ml) (FIGS. 2A-2B and FIG. 8). The results indicate that the capacity of freezing inhibition increases with the degree of sealing, with a statistically maximum plateau achieved by critical sealing (FIG. 2A). Ring sealing (0.01 ml) that nullifies the triple solid/water/air contact line has a mild effect on freezing inhibition at high temperatures (−10° C.) but is not effective below −13° C. Taken together with partial sealing results (0.1 ml), this result implies that the contact nucleation at the air-water-solid triple interface is not be as dominant as that at water/air interface especially at low temperatures. Considering the crystallization efficiency depends on the integration of nucleation probability J and nucleation length (or area), the triple contact line of short length would provide smaller crystallization efficiency compared than the air/water interface even though it has higher J [29, 30]. Overall, the results confirmed that the water/air interface is the primary ice nucleation site for DSC water, and surface oil sealing that removes the water/air interface can effectively inhibit ice nucleation and water freezing.

It was also observed that additional oil beyond the critical sealing has a statistically negligible effect on freezing suppression. This indicates that additional pressure and dampening effects, associated with a long-column of viscous oil phase, have a negligible effect on freezing inhibition. In order to further test this, experiments were performed to test the effects of viscosity of the sealing agents where hydroxy (—OH) terminated polydimethylsiloxane (PDMS) of different chain lengths were used (FIG. 2C). In a similar fashion, statistically significant differences in the capacity of freezing inhibition of PDMS with a viscosity range of 1-5×$10^5$ cP were not observed, with the exception of 3500 cP PDMS which resulted in almost no freezing suppression effect. It was hypothesized that this odd behavior is likely due to the formation of an ordered structure between water and this particular PDMS on the interface through hydrogen bonding, which closely matches the lattice of hexagonal ice [31].

Example 3: Alkanes and Primary Alcohols as Sealing Agents

Most oils are complex mixtures of alkanes, saturated cyclic alkanes, alkylated aromatic groups, and fatty acids among other hydrocarbon compounds. In an effort to more systematically study the observed freezing inhibition effect of supercooled water sealed with an immiscible hydrocarbon phase, two prototypical families of hydrocarbons were tested: linear alkanes and their corresponding primary alcohols of different lengths (FIG. 3). Specifically, alkanes ($C_mH_{2m+2}$, denoted $C_m$, m=5-11) and primary alcohols ($C_mH_{2m+1}OH$, denoted $C_mOH$, m=4-8) were tested as the sealing agents for DSC water at −20° C. Since linear alkanes have very low polarity, they have weak interaction with polar water molecules. On the other hand, the primary alcohols, which are amphipathic, can form strong hydrogen bonds with water through their hydroxyl group (hydrophilic end) and even stable ordered interfacial structures.

Figure 3A:
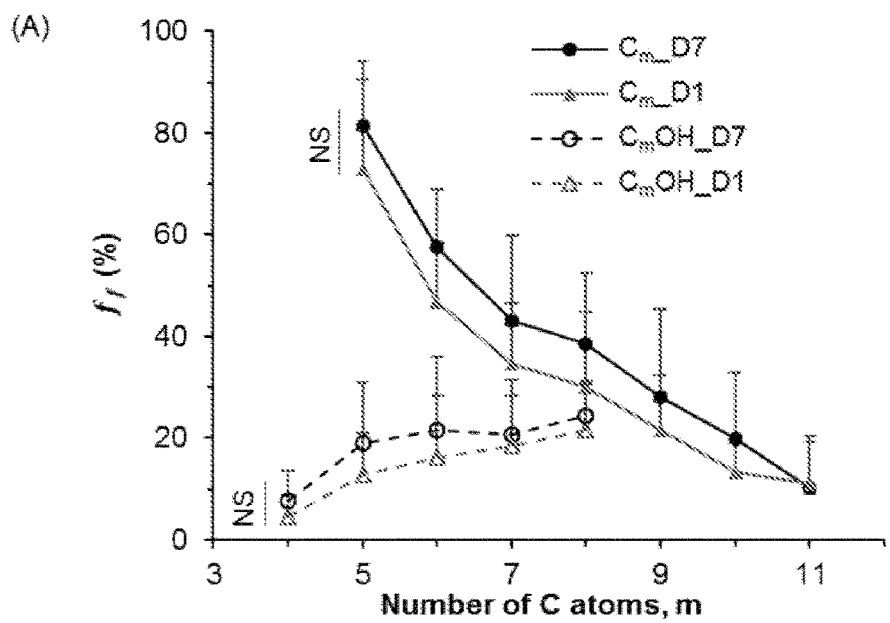
FIG. 3A. Freezing efficiency of 1 ml water sealed with linear alkanes and primary alcohols at −20° C. n=7, N=87. When m>11 for linear alkanes and m>8 for primary alcohols, the sealing agents are frozen at −20° C. and cause DSC water frozen. When m<5, the linear alkanes are gaseous under atmospheric condition and not suitable for sealing. When m<4, the primary alcohols are miscible with water and not suitable for sealing either.
Figure 3B:
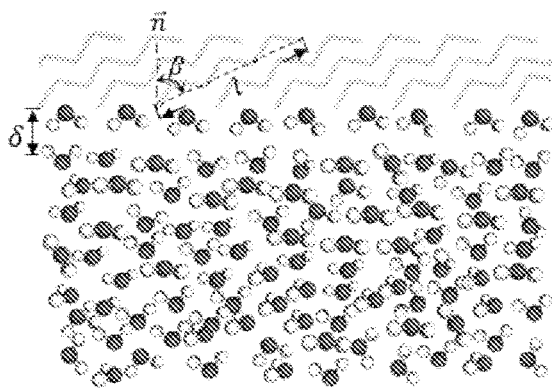
FIG. 3B. Schematic configurations of alkane/water interface, respectively. The alkane molecules are displayed without aliphatic hydrogen atoms and colored in light green. The O and H atoms in hydroxyl group of alcohol and water are shown in red and white dots, respectively.

It has been observed that $f_f$ of DSC water, at −20° C., sealed with alkanes decreases monotonically with increasing carbon number m and chain length/(FIG. 3A). The capacity of alkanes in freezing inhibition matches that of MO (FIG. 2A at −20° C.) at m>9. Given that mineral oils tend to have carbon chain lengths above 10, this result is expected. It is believed that this trend, correlated with the alkane chain length, might also explain the capacity differences between PO and MO in FIG. 1D; PO likely consists of higher carbon chain alkanes than MO based on their densities (PO~0.855-0.88 vs MO~0.838 g/ml). On a molecular level, the mechanism for this trend might lie in the structure of the alkane/water interface. It has been observed that an interfacial electron depletion layer with a thickness δ exists between water and hydrophobic alkane chains by both X-ray reflectivity (XR) measurements [32, 33] and atomistic molecular dynamics (MD) simulations [34, 35]. The few water molecules in the depletion layer (electron density <40% that of bulk water [36]) can buckle in the intermolecular space near the ends of alkane molecules (FIG. 3B), and create a template for the formation of an ice nucleus [25]. The alkane chains adjacent to the water molecules preferentially have their longest axis parallel to the water interface with a tilt angle β[32]. This tilt angle increases with m and 1, resulting in a more parallel orientation for longer alkanes [32]. Accordingly, longer alkane chains are expected reduce the corrugation and roughness of the interface on the side of alkanes. This, consequently, is expected to decrease the number of buckled water molecules and nucleus templates, and thus lower the probability of heterogeneous ice nucleation on that layer [25]. These expectations are in line with the observations of decreasing freezing frequencies for longer alkane chain lengths.

Figure 3C:
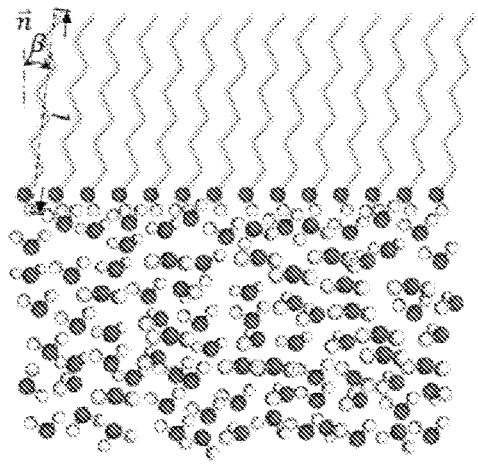
FIG. 3C. Schematic configurations of alcohol/water interface, respectively. The alcohol molecules are displayed without aliphatic hydrogen atoms and colored in light green. The O and H atoms in hydroxyl group of alcohol and water are shown in red and white dots, respectively.

On the other hand, $f_f$ of DSC water, at −20° C., sealed with alcohols increases with m and l. This opposite trend is likely due to the starkly different structures of the alcohol/water interface compared to that of alkane/water interface (FIG. 3C). Unlike the alkanes which prefer a parallel orientation, the primary alcohols orient perpendicularly to the interface with a small β. The primary alcohols align their hydroxyl (—OH) heads toward the interface to form hydrogen bonds with water molecules. Accordingly, no depletion layer of interfacial water exists as in the alkane/water interface. The 2D layer of interfacial water molecules are strongly hydrogen-bonded to the hydroxyl groups, with their H atoms pointing toward alcohol ("H-up") as revealed by heterodyne-detected vibrational sum frequency spectroscopy (SFG) [37]. Therefore, structures and dimensions of the contacting layer of amphilic alcohols essentially determine the distribution and arrangement of interfacial water molecules, and the formation of heterogeneous ice nucleus [31, 38].

Experimental and computational investigations of ice nucleation in droplets under monolayers of long primary alcohol chains with 16≤m≤31, revealed a very low tilt angle β (~7.5-10°) and a very good lattice match between hexagonal ice and the alcohol structure for 29≤m≤31 [39]. For these longest chains ice nucleation occurs at temperatures as high as −1° C. As m and l decrease, the tilt angle β increases up to ~19° for m=16 [40]. In conjunction, a greater lattice mismatch between hexagonal ice lattice and ordered alcohol layer at the interface along with a lower ice nucleation efficiency and freezing temperature were observed [31, 39-41]. Extrapolating this information and trend to the shorter alcohols (4≤m≤8) in this study, a larger tilt angle β (e.g. β=28° for m=6 and β=30° for m=5 [40]) and a greater lattice mismatch between hexagonal ice and ordered alcohol structure given the general structural similarity of primary alcohols are expected. Compared to longer alcohol chains, the interfacial —OH groups anchored to smaller alcohols have stronger in- and out-of-plane fluctuations at the same temperature. Therefore, it is expected that the large lattice mismatch along with the —OH group fluctuations can destabilize any ordered domaine of crystalline water and impede the formation of ice nucleus of critical size [41]. Given that both effects are larger with smaller chain lengths, it is expected that higher nucleation inhibition can be achieved by smaller primary alcohols, in line with the experimental observations. Of note, different orientations of water molecules in the alkane/water and alcohol/water interfaces ("H-down" Vs. "H-up"), and thus different local electric field, might also influence the crystallization in different manners [42, 43]. Once again, it is observed that there is no significant difference of $f_f$ between 1-day and 7-day storage when sealed by either alkanes or alcohols. This further suggests the case-specific, rather than stochastic, nature of water freezing with oil sealing.

Example 4: Stability Under Vibrational, Thermal, and Ultrasonic Disturbances

Having established the efficacy of the deep supercooling approach using either oils or pure alkane and alcohol phases, its stability under vibrational, thermal, and ultrasonic disturbances were studied. Vibrational disturbances were introduced by placing DSC water onto a shaking plate with various shaking speeds and frequencies (SI). When the DSC water (−20° C.) is sealed by MO, its $f_f$ is 0% and 5.6%, respectively, under 0.84 g and 2.1 g centrifugal acceleration (FIG. 4A), which are are much higher than ac/deceleration forces of a commercial airliner (0.2-0.4 g) during potential transportation. Thermal disturbances were induced by putting the DSC samples into 37° C. incubator or plunging them into 37° C. water bath with warming rate of 10° C./min (heated by natural convection in air) or $10^2$ C/min (heated by forced convection in water), respectively. Very few (0% for gas warming, 2.5% for water warming) of the samples freeze under these thermal fluctuations. In contrast, these samples can not endure ultrasonication in 40 kHz ultrasonic water bath (FIG. 4A), with $f_f$ of ~84%. This is probably due to the vigorous collapse of cavitation bubbles in water during ultrasonication [10], which would cause ultrahigh local pressure (>1 GPa) [44], and therefore, significantly increase equilibrium temperature $T_e$ and the degree of supercooling Δ.

Upon the instability of DSC water sealed by MO under ultrasonication, its stability sealed by pure alkanes and primary alcohols was further tested. DSC water sealed by alkanes freeze immediately upon being ultrasonicated (FIGS. 4B-4C), which is consistent with previous observation of MO sealed water since MO has a high content of various alkanes. On the contrary, none of the samples freeze upon ultrasonication if they were sealed by any of the primary alcohols (FIG. 4B). Instead, the sealing alcohols would be emulsified with supercooled water, starting from the interface and then evolving toward supercooled water (FIG. 4C). The exact mechanism of the freezing resistance of DSC water sealed by alcohols to ultrasonic disturbance is still unknown, and one hypothesis would be that ultrasound preferentially transduces its energy into joint molecular motion at interface due to the hydrogen bonding between water and amphoric alcohols to form nanoemulsion [45], rather than cavitation bubbles for ice nucleation in viscous DSC water.

Example 5: Stochastic Process of Ice Nucleation and Freezing

The formation of a critical ice embryo, i.e. a successful nucleation, in metastable supercooled water is generally regarded as a stochastic process that does not depend on the number of previous nucleation trials or correlate to other nucleation events during the same period. In addition, heterogenous nucleation is the major type of crystallization in this study since homogeneous nucleation in water occurs at much lower temperatures (around −40° C.). As a result, the heterogeneous ice nucleation on water surfaces/interfaces would follow Poisson statistics $$\ln(1-f_f(t)) = -J(T) \cdot S \cdot t$$

where $f_f(t)$ is the freezing frequency after supercooling of a period t, J(T) is the nucleation rate at temperature T, and S is the area of heterogeneous nucleation sites. Therefore, for water samples of the same volume and shape under a constant temperature, the non-frozen (supercooled) fraction is expected to decline exponentially with time.

However, in the experiments, it has been found that $f_f(t)$ of DSC water with oil sealing does not change significantly after Day 3 as shown in FIGS. 1A-1D, FIG. 3A, FIGS. 6A-6B, and FIGS. 7A-7B. These results indicate that the heterogeneous ice nucleation in DSC water sealed by oil phase does not follow the conventional theory of stochastic nucleation processes at the interface. Particularly, since 45.8% of 100 ml DSC water (−16° C.) sealed by PO are frozen post 1-day storage (FIG. 1D), In (1−0.458)=−J(−16° C.)·S·1, which gives rise to J(−16° C.)·S=0.612. Therefore, the expected fraction of unfrozen samples, $1-f_f(t)=e^{-0.612t}$, would decrease exponentially with storage time for DSC water of the same volume and shape at −16° C. As a result, the fraction of unfrozen samples would be 0.22% and $2.5 \times 10^{-25}$% on Day-10 and Day-100, respectively, which implies almost all the sample would be frozen after 10-day storage. However, it has been observed that 22.9% (8 out of 35) of samples were still unfrozen post 100-day storage in the experiments. Moreover, no freezing event occurred between Day-3 and Day-100; that is all the samples that were unfrozen on Day-3 remained unfrozen till the end of the experiments on Day-100. These observations strongly demonstrated a non-stochastic process of ice nucleation in the DSC water-oil phase systems.

Using similar heuristics, the experimental results also suggest that the freezing we observed is not due to homogeneous ice nucleation either, where the formation of critical ice embryo is caused by spontaneous aggregation of water molecules via random translational, rotational, and vibrational movements that would conform stochastic process.

Example 6: Freezing Point Depression Due to Oil-Water Mixing

When a water sample is sealed by an oil phase (i.e. mixed oils, and pure alkanes and alcohols) for DSC, the "immiscible" oil might slightly dissolve in supercooled water to decrease the equilibrium melting temperature $T_e$ below 0° C., the equilibrium melting point of pure water under atmospheric conditions. Therefore, the potential depression of freezing point was quantified due to this effect and whether it's comparable to the high degree of supercooling observed in the experiments was assessed. According to the Bladgen's Law, the extent of freezing point depression $\Delta T_F$ can be calculated by $$\Delta T_F = ibK_F$$

where i is the Van't Hoff factor (i=1 for nonelectrolytes or oil phase in this study), b is the molality of oil phase in water, and $K_F$ is the cryoscopic constant ($K_F$=1.85 K·kg/mol for water). Therefore, $\Delta T_F$ can be determined by the solubility of sealing oils in water at DSC temperatures. Solubility of oils in metastable water at DSC temperatures are not readily available; as such $\Delta T_F$ was assessed by the available solubility data of oils in water under room temperature. This approach, likely, leads to an overestimation since solubility of oils in water typically increases with temperature.

For oil mixtures (MO, OO, PO, NO, and PDMS) and linear alkanes ($C_5$~$C_{11}$) utilized in this study, the maximum solubility is 0.04 g/L (or 0.55 mM) ($C_5$ in water), and the corresponding estimate for $\Delta T_F$ is less than $1.03 \times 10^{-3}$° C., which is negligible compared to the degree of supercooling $\Delta T$ (10 to 20° C.) achieved using these oil phases as sealing agents.

For alcohols used in the examples, the maximum solubility is 73 g/L (or 0.98 M) ($C_4OH$ in water at room temperature) and the corresponding estimate for $\Delta T_F$ is less than 1.82° C. This likely overestimated freezing point depression accounts for about 9.1% of $\Delta T$ (20° C.) enabled by alcohol sealing. Moreover, the DSC water and sealing alcohols are likely not mixed altogether. The stable contact interface with strong hydrogen bonding on the head and a long hydrophobic tail of alcohols, low molecular mobility, and viscous water at −20° C. would significantly impede the diffusion of alcohol molecules into water. Therefore, the depression of freezing temperature due to oil-water mixing does not play a significant role in achieving the observed high degree of supercooling in the experiments.

Example 7: Supercooled Cell Suspension

Figure 9A:
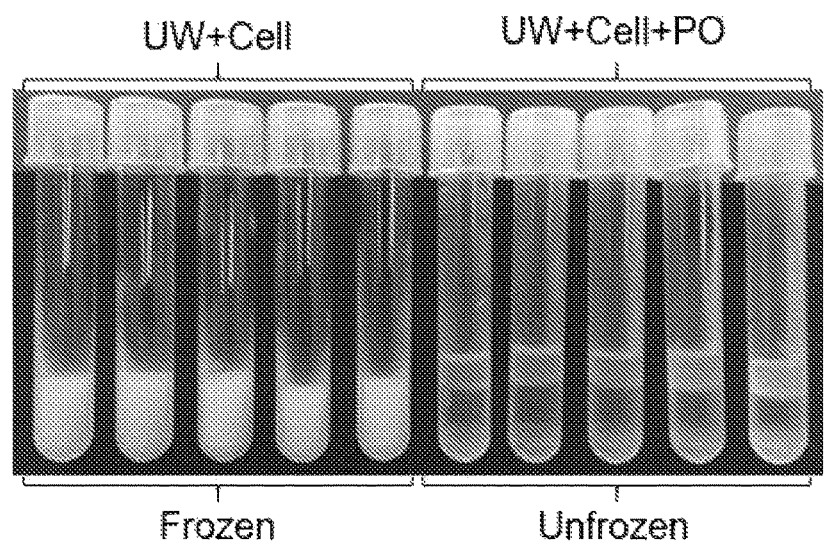
FIG. 9A. Representative image of deeply supercooled cell suspension with or without surface sealing.
Figure 9B:
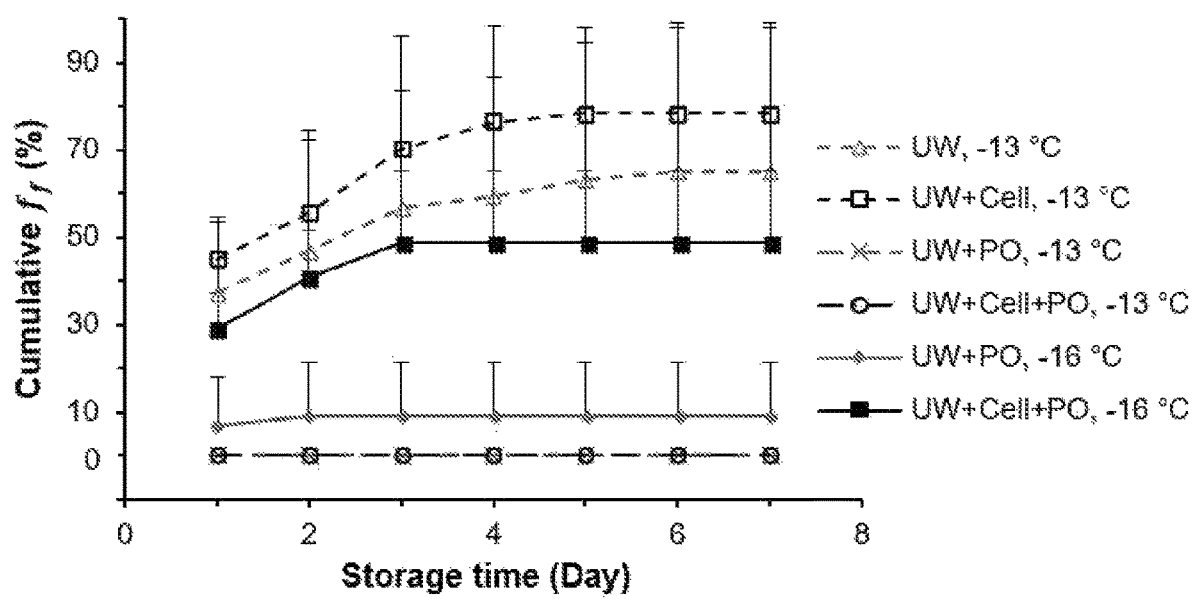
FIG. 9B. Cumulative freezing frequency (ff) for 1 ml UW solution or cell suspensions with or without surface sealing over 7 days. Error bars represent standard deviations.

Experiments were preformed to test cell suspensions that were sealed by paraffin oil (PO). 1 ml cell suspension of 1 million adipose-derived stem cells (ADSCs) was stored in each polystyrene tube for 7 days at −13° C. Cells were suspended in University of Wisconsin (UW) solution as basal supercooling solution. FIG. 9A shows deeply supercooled cell suspension with surface sealing were unfrozen. The cumulative freezing frequency (ff) for 1 ml UW solution or cell suspensions with or without surface sealing over 7 days were also calculated (FIG. 9B). Number of independent experiments n=5, number of total tested samples for each case N=50. The results show that the cumulative freezing frequency for cell suspensions sealed by PO did not increase for at least 7 days.

Figure 10:
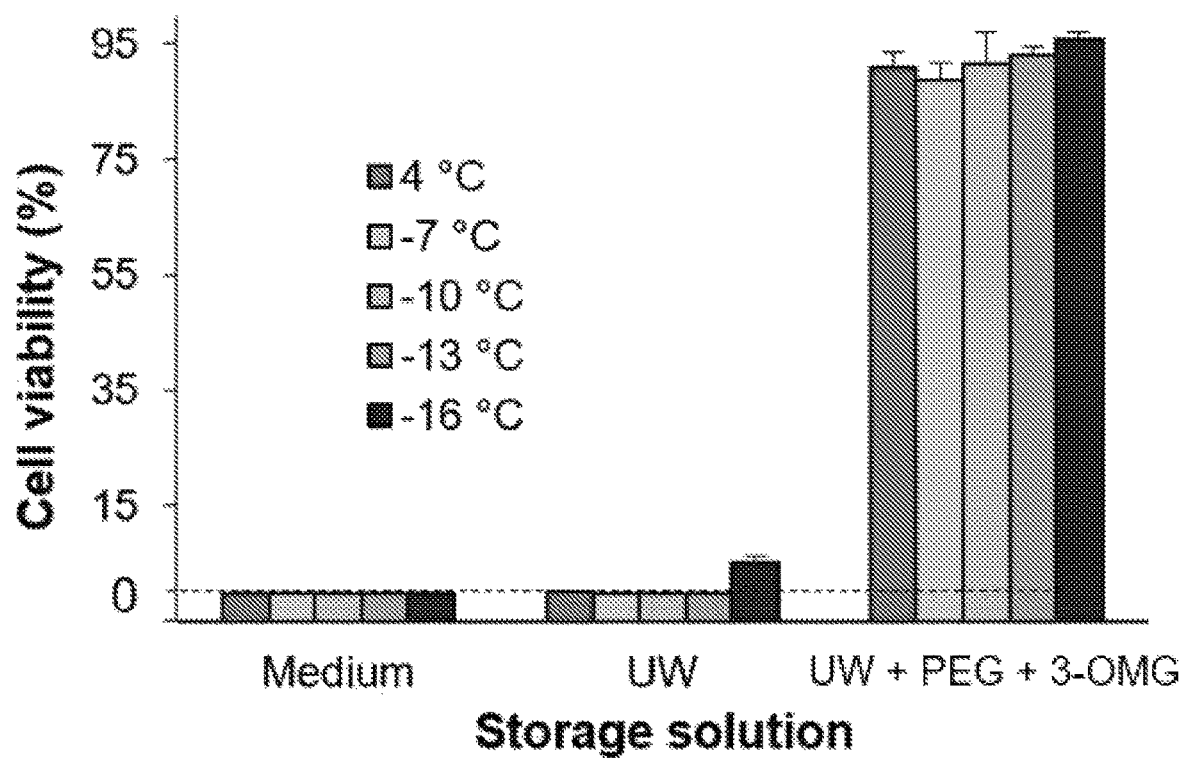
FIG. 10. Quantitative cell viabilities post 7-day storage under various conditions (n=3).

The typical storage solutions were also tested. ADSC (Adipose Derived Stem Cell) medium, UW, and UW supplemented with 5% (w/v) 35 Kda polyethylene glycol (PEG) and 0.2 M 3-O-methyl glucose (3-OMG) (UW+PEG+3-OMG) were used. Phase and fluorescence micrographs were taken to determine cell viability staining post 7-day storage at various temperatures. Live cells were stained green by calcein AM, while dead cells were red by ethidium homodimer. FIG. 10 shows quantitative cell viabilities post 7-day storage under various conditions (n=3). The results indicate that UW supplemented with 5% (w/v) 35 Kda polyethylene glycol (PEG) and 0.2 M 3-O-methyl glucose (3-OMG) had the highest cell viability percentage.

Figure 11:
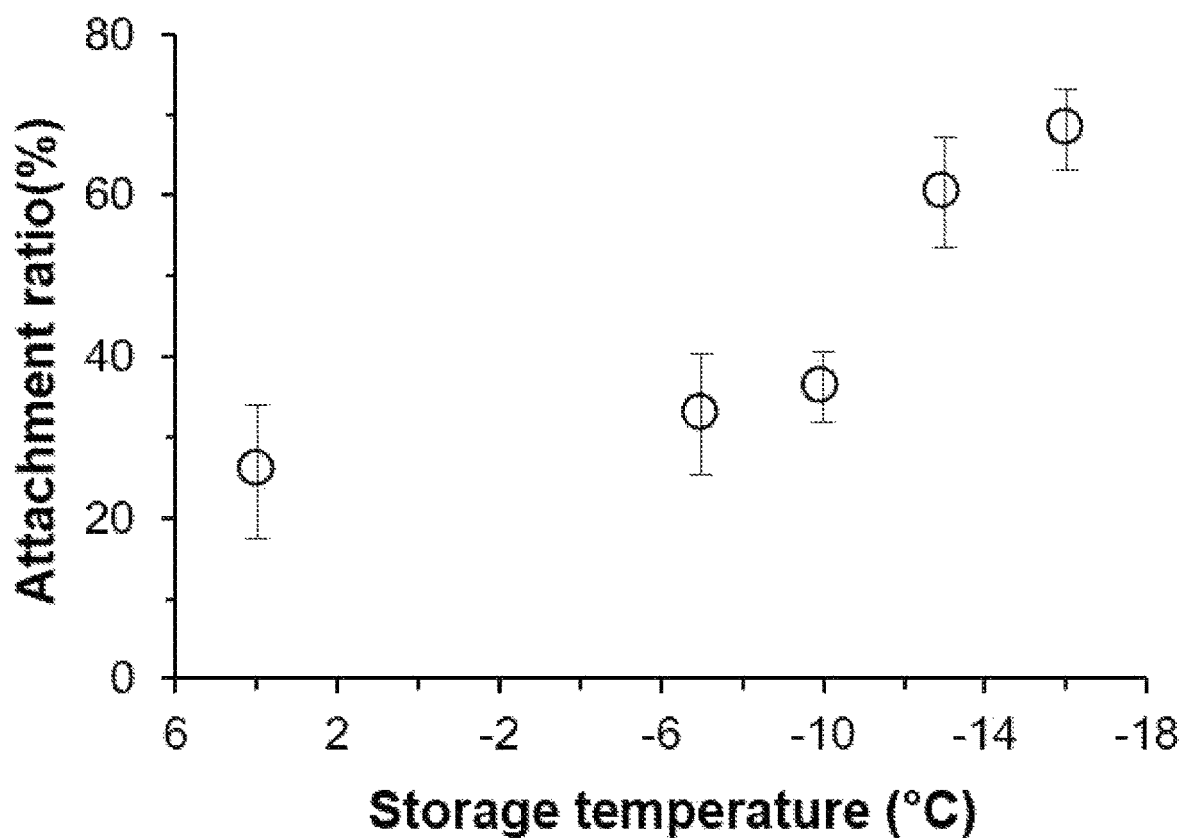
FIG. 11. Cell attachment ratio of preserved ADSCs post 7-day storage in UW+PEG+3-OMG solution at different temperatures.

Attachment of ADSCs post 7-day storage in UW+PEG+3-OMG solution at different temperatures were examined. Phase micrographs of ADSC attachment after 1-day culture in 37° C. incubator were taken. Control was the fresh cells of the same seeding density. Attachment ratio was calculated as the percentage of the number of attached live cells after one day culture of post-storage cells out of the number of fresh cells seeded and cultured in the same way (FIG. 11). All storage groups were sealed with PO to prevent potential ice formation (n=3).

Example 8: Preservation of Human Red Blood Cells

Figure 12A:
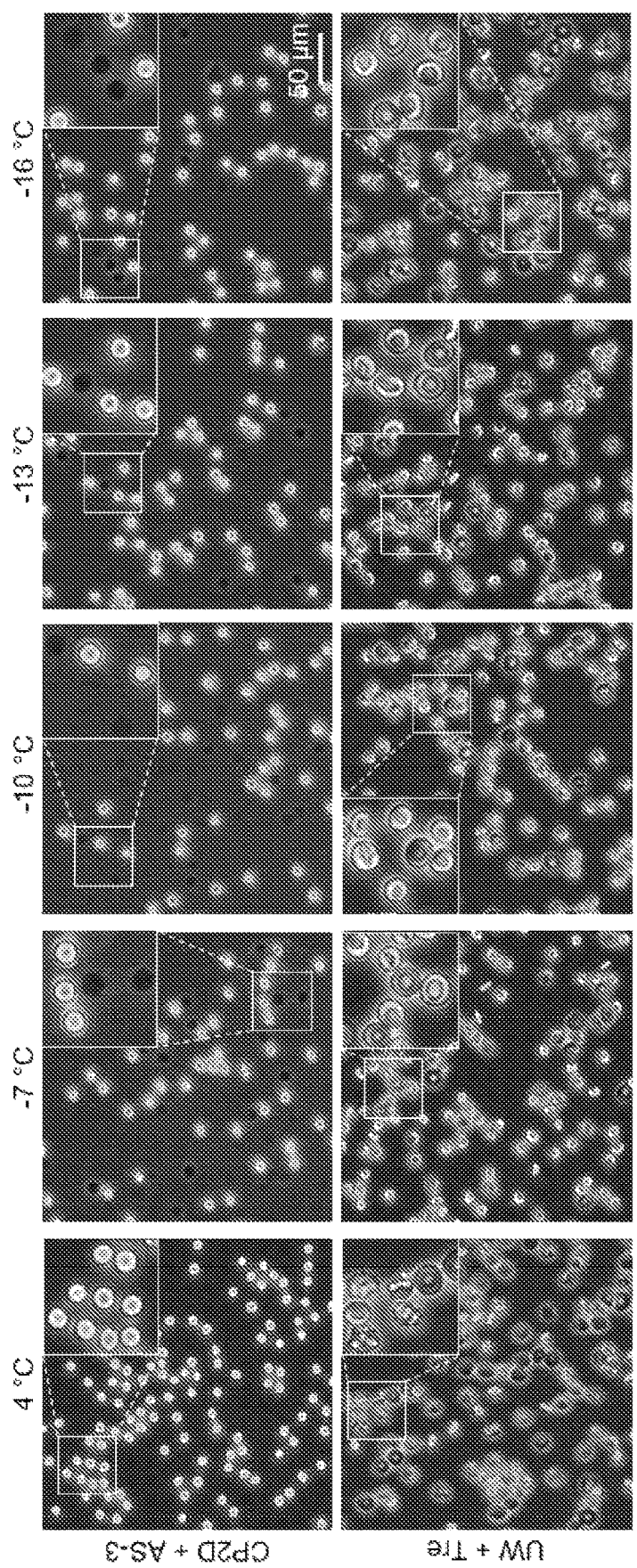
FIG. 12A. Phase micrographs of RBCs suspended in phosphate-buffered saline (PBS) post 42-day storage.
Figure 12C:
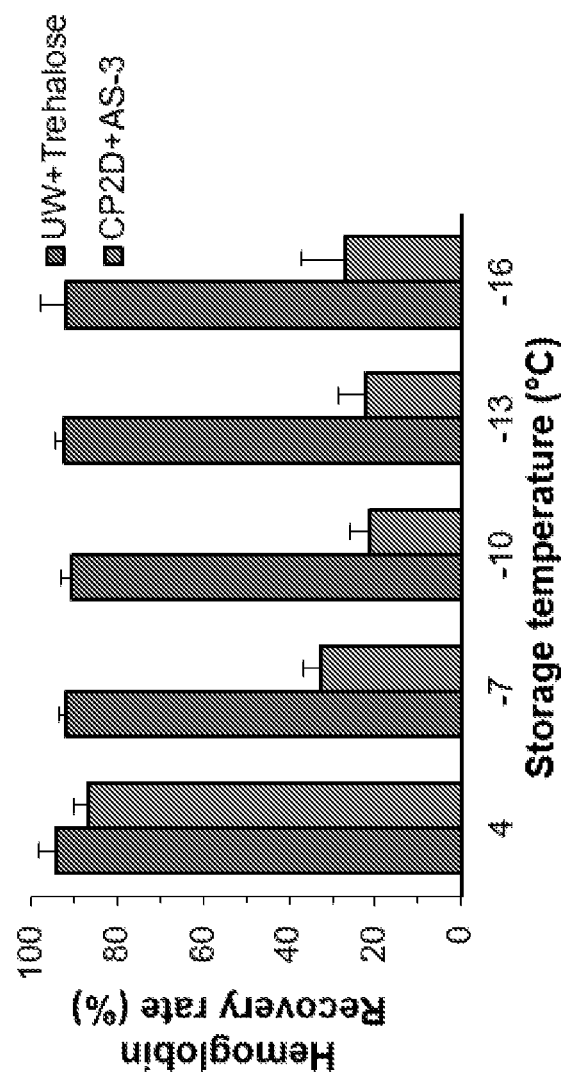
FIG. 12C. Hemoglobin recovery rate of RBCs post 42-day storage (n=3).
Figure 12B:
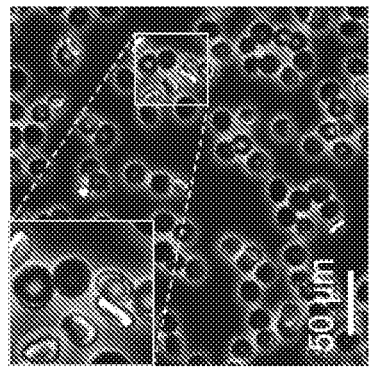
FIG. 12B. Phase micrographs of fresh red blood cells (RBCs) (0-day) suspended in PBS.

Experiments were performed to test preservation of human red blood cells (RBCs) for 42 days at various temperatures in conventional anticoagulant citrate phosphate double dextrose (CP2D) supplemented with additive solution 3 (AS-3) (CP2D+AS-3), and UW solution supplemented with 5% (w/v) trehalose. All of these samples were sealed by paraffin oil. FIG. 12A shows typical phase micrographs of RBCs suspended in phosphate-buffered saline (PBS) post 42-day storage. Black dots are the debris of lysed RBCs without holding hemoglobin. FIG. 12B shows typical phase micrographs of fresh RBCs (0-day) suspended in PBS. FIG. 12C shows hemoglobin recovery rate of RBCs post 42-day storage (n=3). The results show that UW solution supplemented with 5% (w/v) trehalose had greater than 80% of hemoglobin recovery rate at various temperatures.

Figure 13A:
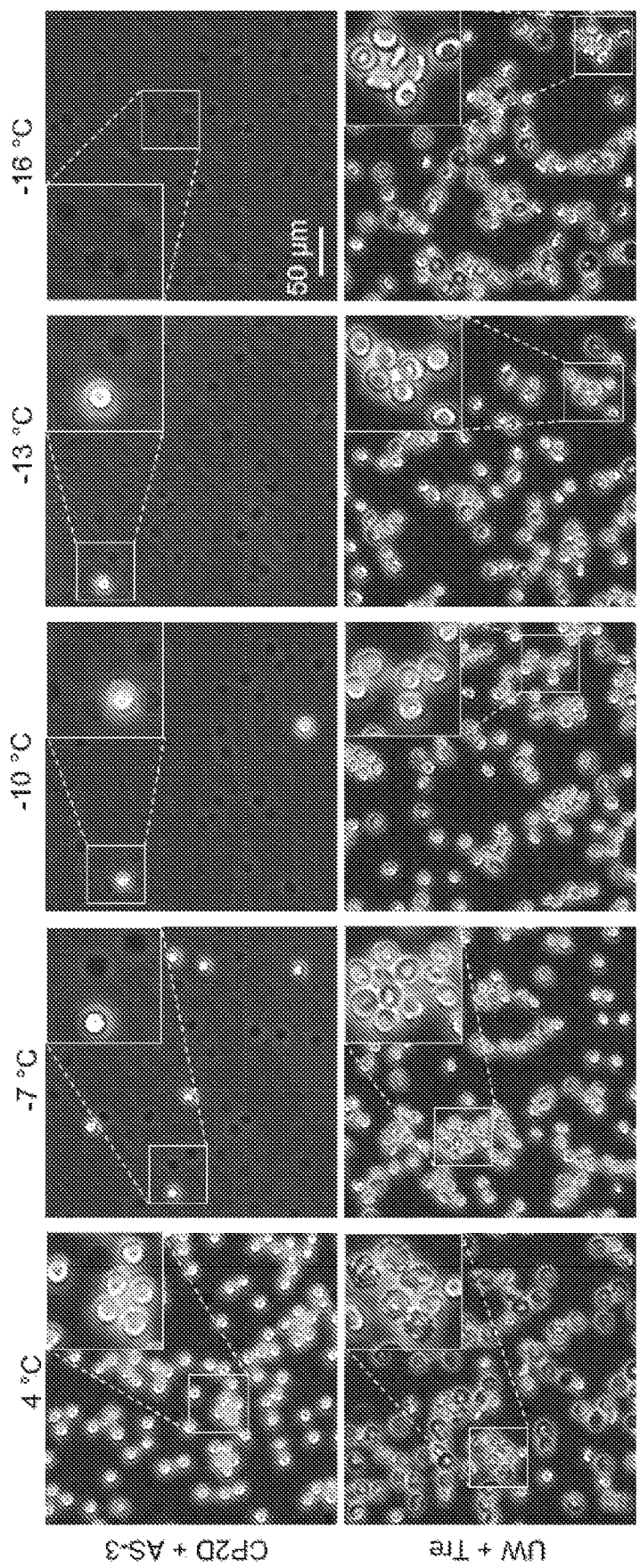
FIG. 13A. Phase micrographs of RBCs suspended in PBS post 100-day storage.
Figure 13C:
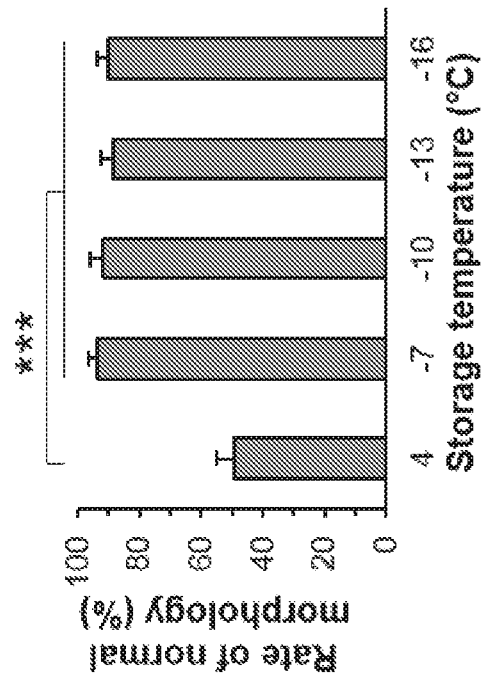
FIG. 13C. The ratio of RBCs with normal morphology and size post 100-day storage in UW+Trehalose solution.
Figure 13B:
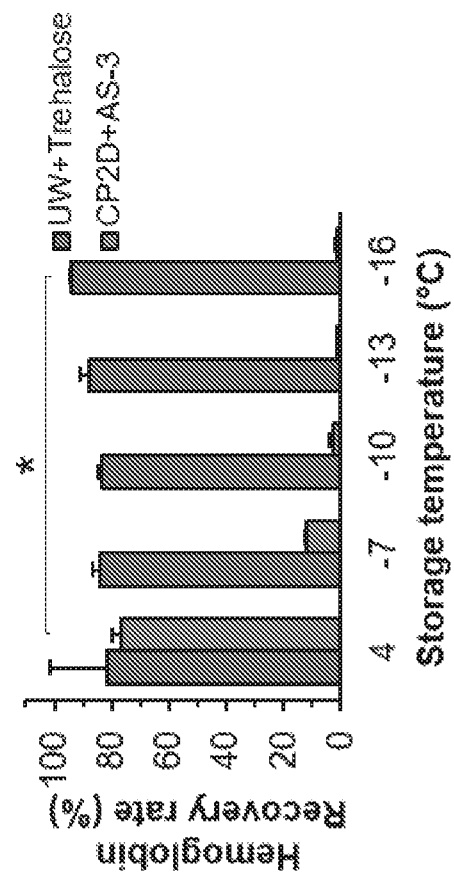
FIG. 13B. Hemoglobin recovery rate of RBCs post 100-day storage (n=3).

RBCs were further preserved in CP2D+AS-3, and UW solution+trehalose for 100 days. FIG. 13A shows typical phase micrographs of RBCs suspended in PBS post 100-day storage. FIG. 13B shows hemoglobin recovery rate of RBCs post 100-day storage (n=3). FIG. 13C shows the ratio of RBCs with normal morphology and size post 100-day storage in UW+Trehalose solution. Bright disk-shaped RBCs with smooth plasma membrane and diameter 5 μm D 10 μm are regarded as normal morphology. n=3. The total number of counted cells N=1800±50 for each case.

Example 9: Preservation of Hepatocytes

Figure 14:
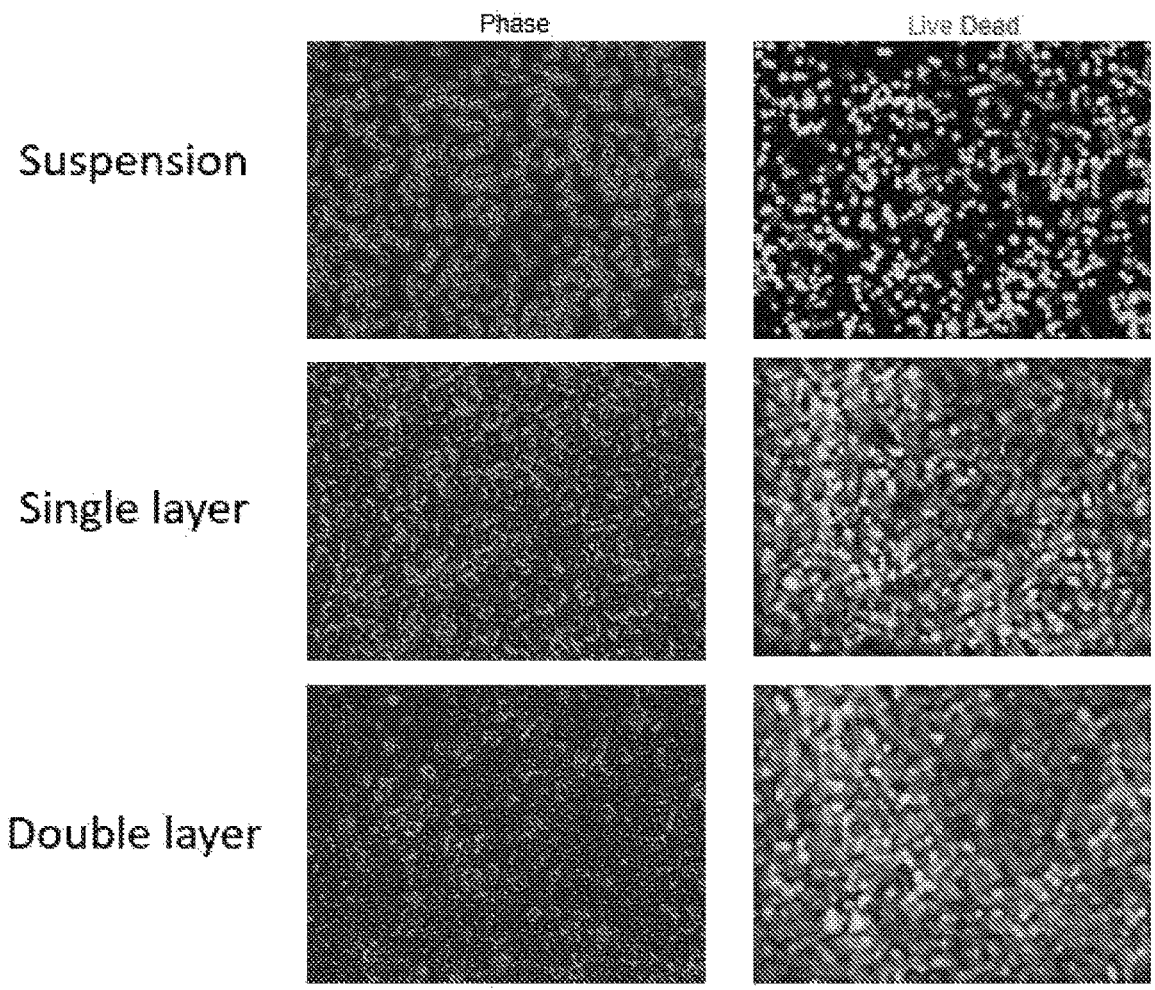
FIG. 14. Images of hepatocytes that were stored in suspension, single-layer culture, or double-layer culture.
Figure 15:
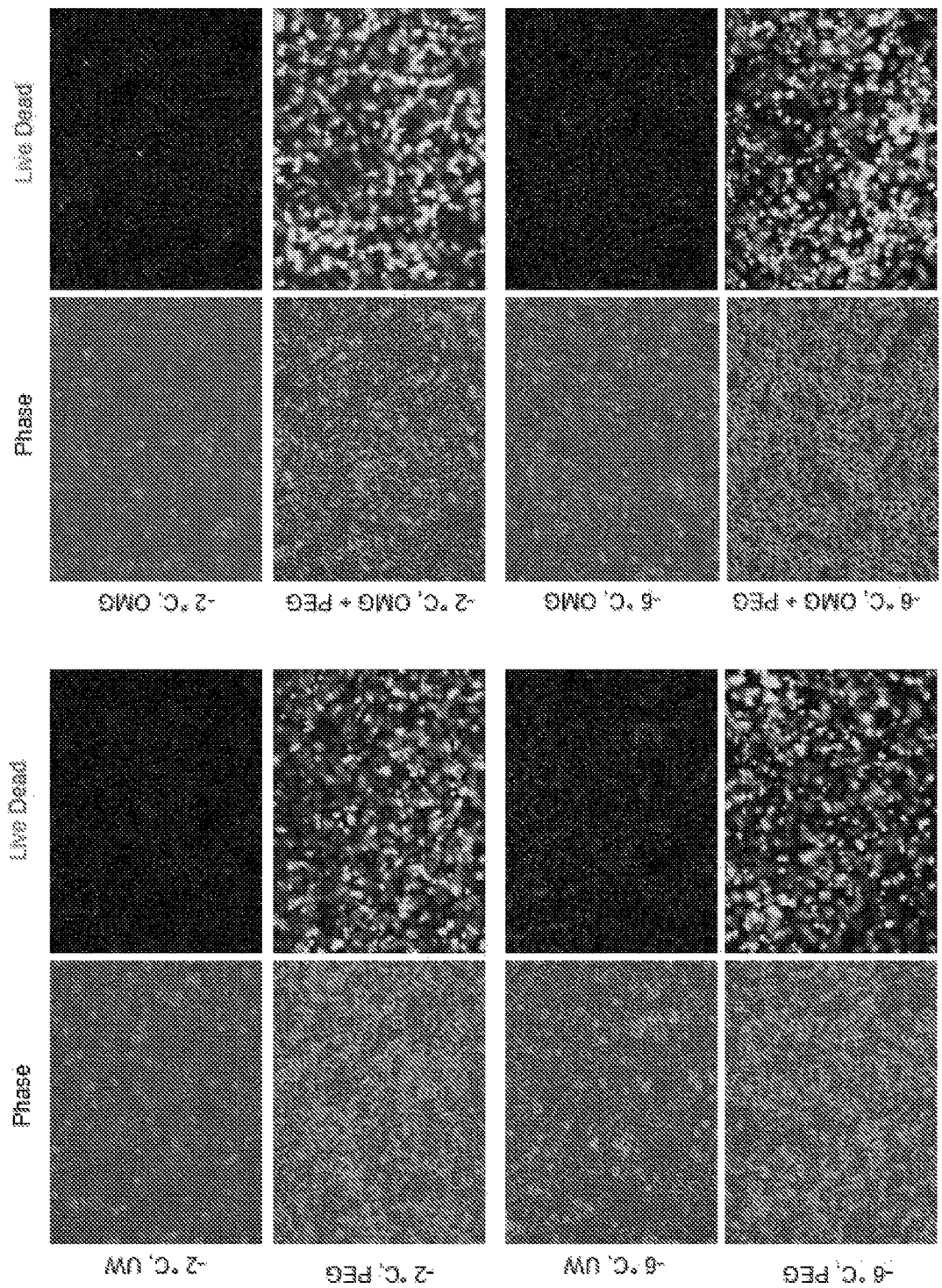
FIG. 15. Images of hepatocytes that were stored in (1) UW; (2) UW+5% PEG (labeled as "PEG"); (3) UW+0.2 M 3-OMG (labeled as "OMG"); (4) UW+5% PEG+0.2 M 3-OMG (labeled as "OMG+PEG") at various temperatures.

Experiments were performed to test preservation of hepatocytes. The cells were cultured at 37° C. Some of them were subjected to heat-shock at 42.5° C. The cells were stored in suspension, single-layer culture, or double-layer culture (FIG. 14), and were stored in (1) UW; (2) UW+5% PEG; (3) UW+5% PEG+0.2 M 3-OMG at various temperatures. The results show that single-layer plated hepatocytes in UW solution with 5% 35 kG PEG had the highest cell viability.

Example 10: Supercooling with Binary Alkane/Alcohol Mixtures

Figure 16A:
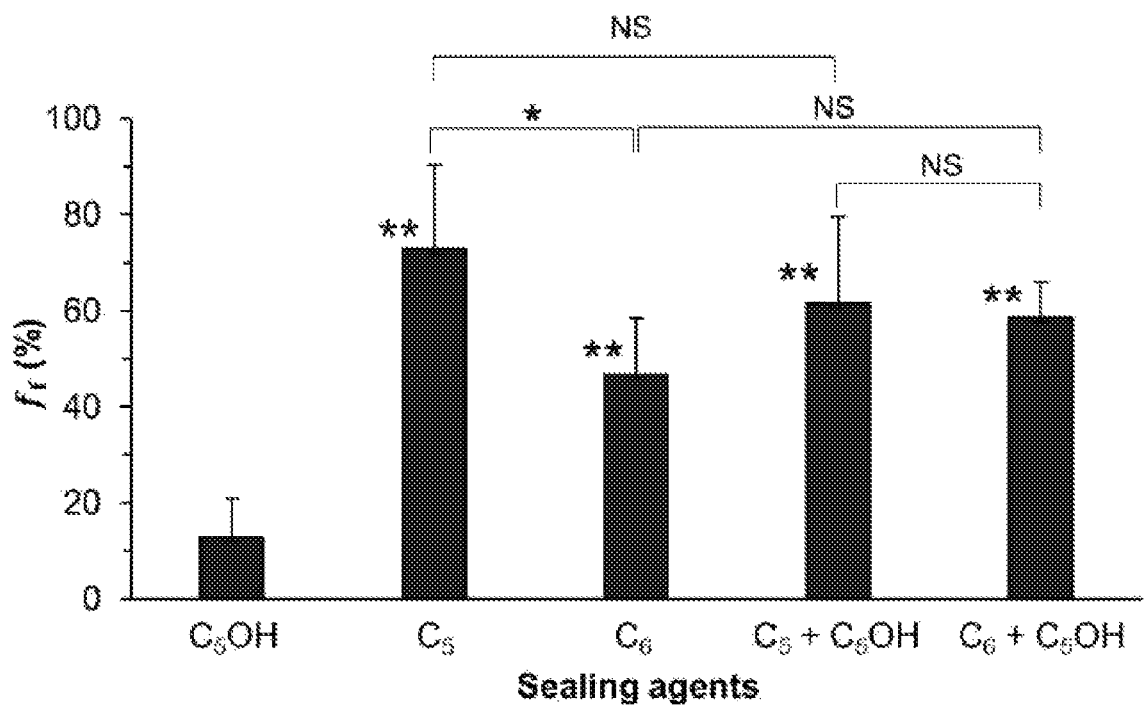
FIG. 16A. $f_f$ of DSC water post 1-day supercooling for 1 ml DSC water at −20° C. sealed with 0.5 ml alcohol ($C_5$OH), alkanes ($C_5$ and $C_6$), and their binary combinations ($C_5$+$C_5$OH and $C_6$+$C_5$OH). In the binary mixtures, the concentration of the alcohol ($C_5$OH) is 1% (v/v). The marks just above the columns (**) indicate the p value between $C_5$OH and respective sealing agent. n=7, N=87.

Additional experiments were performed for water supercooling with two binary alkane/alcohol mixtures, $C_5+C_5OH$ and $C_6+C_5OH$, with the concentration of alcohol ($C_5OH$) being 1% (v/v) to seal the water phase. The choice of $C_5$ and $C_6$ is due to the original high freezing frequencies observed when they were used as the sealing phase among all the alkanes. Whether the small fraction of alcohols could generate an interfacial layer between the binary mixture and water, forming hydrogen bonds between alcohol and water molecules, was tested. The interfacial layer, in theory, can result in a low freezing frequency for the water, where results should reach that of the sealing by the pure $C_5OH$ solution. Given that $C_5OH$ is denser than both alkanes, one would expect it to be at the water interface forming a monolayer. However, it was determined that either such an interface is not stable or that it never fully forms and the interface consists likely as a mixture of alcohols and alkanes. Neither of the alkane/alcohol binary mixtures were nearly as effective in suppressing freezing as the pure alcohols (FIG. 16A). In fact, the freezing frequency achieved by sealing via binary mixtures are not statistically different from the pure alkanes (FIG. 16A).

Figure 16B:
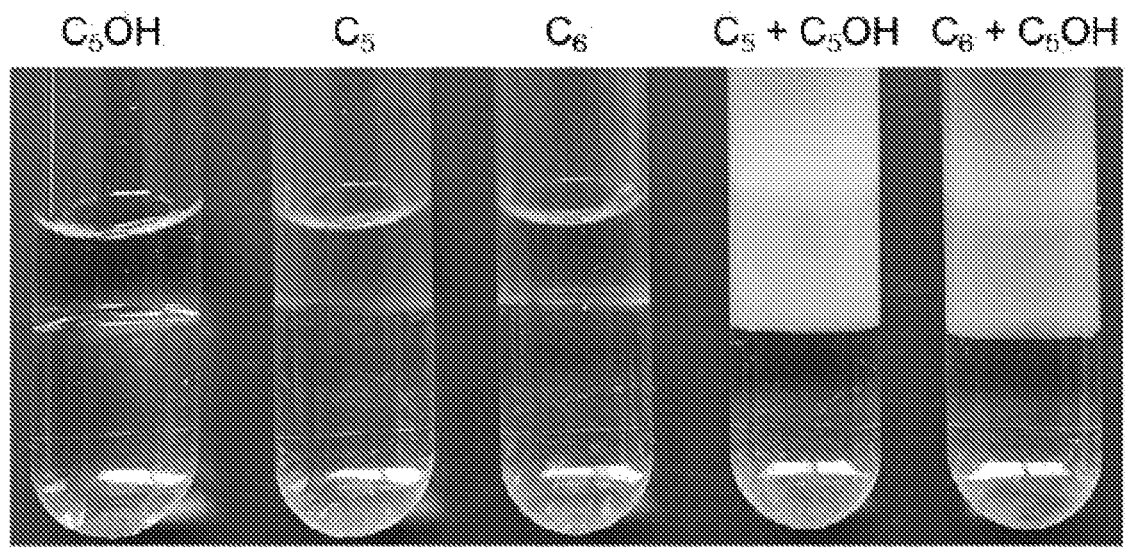
FIG. 16B. Corresponding images of water loaded with the sealing agents before supercooling test. Significant portion of water is sucked into the binary sealing agents ($C_5$+$C_5$OH and $C_6$+$C_5$OH).

Surprisingly, a significant amount of water would be sucked into the bulk of the binary alkane/alcohol mixture, forming emulsions (a milky/cloudy phase) on top of sealed water (FIG. 16B). It is believed that alcohols in alkane rich binary mixtures form very heterogenous microdomains as opposed to a segregated monolayer. Thus, a pure alcohol-water interface is not likely to exist in the experiments. The likely heterogeneity of the interface and further the heterogeneity of the bulk of the binary mixture itself might cause water molecules to be driven into this binary mixture.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

REFERENCES

1. Bartels-Rausch, T., Chemistry: Ten things we need to know about ice and snow. Nature, 2013. 494(7435): p. 27-29.
2. Lee Jr, R. E. and G. J. Warren, Biological ice nucleation and its applications. 1995.
3. Atkinson, J. D., et al., The importance of feldspar for ice nucleation by mineral dust in mixed-phase clouds. Nature, 2013. 498(7454): p. 355-8.
4. Burkhardt, U. and B. Kärcher, Global radiative forcing from contrail cirrus. Nature climate change, 2011. 1(1): p. 54.
5. Costanzo, J. P., et al., Hibernation physiology, freezing adaptation and extreme freeze tolerance in a northern population of the wood frog. J Exp Biol, 2013. 216(Pt 18): p. 3461-73.
6. Yiu, W. K., et al., Cryosurgery: A review. Int J Angiol, 2007. 16(1): p. 1-6.
7. Morris, G. J. and E. Acton, Controlled ice nucleation in cryopreservation—a review. Cryobiology, 2013. 66(2): p. 85-92.
8. James, C., G. Purnell, and S. J. James, A review of novel and innovative food freezing technologies. Food and bioprocess technology, 2015. 8(8): p. 1616-1634.
9. Huang, H., et al., Pre-dehydration and Ice Seeding in the Presence of Trehalose Enable Cell Cryopreservation. ACS Biomaterials Science & Engineering, 2017.
10. Hickling, R., Nucleation of freezing by cavity collapse and its relation to cavitation damage. Nature, 1965. 206 (4987): p. 915-917.
11. Nagare, B., et al., Comparing contact and immersion freezing from continuous flow diffusion chambers. Atmospheric Chemistry and Physics, 2016. 16(14): p. 8899-8914.
12. Langham, E. and B. Mason. The heterogeneous and homogeneous nucleation of supercooled water. in Proceedings of the Royal Society of London A: Mathematical, Physical and Engineering Sciences. 1958. The Royal Society.
13. Krämer, B., et al., Homogeneous nucleation rates of supercooled water measured in single levitated microdroplets. The Journal of Chemical Physics, 1999. 111(14): p. 6521-6527.
14. Koop, T., et al., Freezing of HNO3/H2SO4/H2O solutions at stratospheric temperatures: Nucleation statistics and experiments. The Journal of Physical Chemistry A, 1997. 101(6): p. 1117-1133.
15. Murray, B. J., et al., Kinetics of the homogeneous freezing of water. Phys Chem Chem Phys, 2010. 12(35): p. 10380-7.
16. Gholaminejad, A. and R. Hosseini, A study of water supercooling. Journal of Electronics Cooling and Thermal Control, 2013. 3(01): p. 1.
17. Usta, O. B., et al., Supercooling as a viable non-freezing cell preservation method of rat hepatocytes. PloS one, 2013. 8(7): p. e69334.
18. Shaw, R. A., A. J. Durant, and Y. Mi, Heterogeneous surface crystallization observed in undercooled water. J Phys Chem B, 2005. 109(20): p. 9865-8.
19. Berendsen, T. A., et al., Supercooling enables long-term transplantation survival following 4 days of liver preservation. Nat Med, 2014. 20(7): p. 790-3.
20. Sanz, E., et al., Homogeneous ice nucleation at moderate supercooling from molecular simulation. Journal of the American Chemical Society, 2013. 135(40): p. 15008-15017.

21. Hoose, C. and O. Möhler, Heterogeneous ice nucleation on atmospheric aerosols: a review of results from laboratory experiments. Atmospheric Chemistry and Physics, 2012. 12(20): p. 9817.
22. Cahn, J. W., Critical point wetting. The Journal of Chemical Physics, 1977. 66(8): p. 3667-3672.
23. Djikaev, Y., et al., Thermodynamic conditions for the surface-stimulated crystallization of atmospheric droplets. The Journal of Physical Chemistry A, 2002. 106(43): p. 10247-10253.
24. Tabazadeh, A., Y. S. Djikaev, and H. Reiss, Surface crystallization of supercooled water in clouds. Proc Natl Acad Sci USA, 2002. 99(25): p. 15873-8.
25. Fitzner, M., et al., The Many Faces of Heterogeneous Ice Nucleation: Interplay Between Surface Morphology and Hydrophobicity. J Am Chem Soc, 2015. 137(42): p. 13658-69.
26. Cox, S. J., et al., Molecular simulations of heterogeneous ice nucleation. I. Controlling ice nucleation through surface hydrophilicity. J Chem Phys, 2015. 142(18): p. 184704.
27. Knight, C. A., The contact angle of water on ice. Journal of Colloid and Interface Science, 1967. 25(2): p. 280-284.
28. Konno, A. and K. Izumiyama. On the relationship of the oil/water interfacial tension and the spread of oil slick under ice cover. in Proceedings of the 17th International Symposium on Okhotsk Sea and Sea Ice. 2002.
29. Suzuki, S., et al., Freezing of water droplets on silicon surfaces coated with various silanes. Chemical Physics Letters, 2007. 445(1): p. 37-41.
30. Sear, R. P., Nucleation at contact lines where fluid-fluid interfaces meet solid surfaces. Journal of Physics: Condensed Matter, 2007. 19(46): p. 466106.
31. Gavish, M., et al., Ice nucleation by alcohols arranged in monolayers at the surface of water drops. Science, 1990. 250(4983): p. 973-5.
32. Fukuto, M., et al., Nanoscale Structure of the Oil-Water Interface. Phys Rev Lett, 2016. 117(25): p. 256102.
33. Jensen, T. R., et al., Water in contact with extended hydrophobic surfaces: direct evidence of weak dewetting. Phys Rev Lett, 2003. 90(8): p. 086101.
34. Wick, C. D., et al., Computational investigation of the n-alkane/water interface with many-body potentials: the effect of chain length and ion distributions. The Journal of Physical Chemistry C, 2011. 116(1): p. 783-790.
35. Qiu, Y. and V. Molinero, Strength of Alkane-Fluid Attraction Determines the Interfacial Orientation of Liquid Alkanes and Their Crystallization through Heterogeneous or Homogeneous Mechanisms. Crystals, 2017. 7(3): p. 86.
36. Poynor, A., et al., How water meets a hydrophobic surface. Physical review letters, 2006. 97(26): p. 266101.
37. Mondal, J. A., et al., Alkyl Chain Length Dependent Structural and Orientational Transformations of Water at Alcohol-Water Interfaces and Its Relevance to Atmospheric Aerosols. J Phys Chem Lett, 2017. 8(7): p. 1637-1644.
38. Seeley, L. H. and G. T. Seidler, Two-dimensional nucleation of ice from supercooled water. Phys Rev Lett, 2001. 87(5): p. 055702.
39. Dai, Y. and J. S. Evans, Molecular Dynamics Simulations of Template-Assisted Nucleation: Alcohol Monolayers at the Air-Water Interface and Ice Formation. The Journal of Physical Chemistry B, 2001. 105(44): p. 10831-10837.
40. Popovitz-Biro, R., et al., Induced freezing of supercooled water into ice by self-assembled crystalline monolayers of amphiphilic alcohols at the air-water interface. Journal of the American Chemical Society, 1994. 116(4): p. 1179-1191.
41. Qiu, Y., et al., Ice Nucleation Efficiency of Hydroxylated Organic Surfaces Is Controlled by Their Structural Fluctuations and Mismatch to Ice. J Am Chem Soc, 2017. 139(8): p. 3052-3064.
42. Abdelmonem, A., et al., Surface charge-induced orientation of interfacial water suppresses heterogeneous ice nucleation on α-alumina (0001).
43. Ehre, D., et al., Water freezes differently on positively and negatively charged surfaces of pyroelectric materials. Science, 2010. 327(5966): p. 672-5.
44. Hickling, R., Transient, high-pressure solidification associated with cavitation in water. Phys Rev Lett, 1994. 73(21): p. 2853-2856.
45. Gupta, A., et al., Nanoemulsions: formation, properties and applications. Soft Matter, 2016. 12(11): p. 2826-41.
46. Koop, T., et al., Freezing of HNO3/H2SO4/H2O solutions at stratospheric temperatures: Nucleation statistics and experiments. The Journal of Physical Chemistry A, 1997. 101(6): p. 1117-1133.
47. Niedermeier, D., et al., Heterogeneous ice nucleation: exploring the transition from stochastic to singular freezing behavior. Atmospheric Chemistry and Physics, 2011. 11(16): p. 8767-8775.
48. Krämer, B., et al., Homogeneous nucleation rates of supercooled water measured in single levitated microdroplets. The Journal of Chemical Physics, 1999. 111(14): p. 6521-6527.
4. Paasimaa, S., Factors affecting water solubility in oils. Vaisala News, 2005. 169: p. 24-25.

What is claimed is:

1. A method of supercooling an aqueous sample comprising a biological sample, the method comprising:
providing a container comprising an aqueous sample comprising a biological sample;
applying a layer of an immiscible liquid phase of sufficient thickness to separate the aqueous sample from air to diminish primary heterogeneous nucleation at the aqueous sample/air interface, wherein the volume of the aqueous sample is greater than 10 ml, and wherein the immiscible liquid phase forms a surface sealing layer that remains intact for more than 7 days to remove an interface between the aqueous sample and the air and is not mixed into the aqueous sample; and
supercooling the aqueous sample to a temperature that is below 0° C., wherein the aqueous sample is supercooled to a degree of supercooling (ΔT) that is greater than 10° C., and wherein the aqueous sample is maintained in supercooled state for more than 7 days.

2. The method of claim 1, wherein the aqueous sample is an aqueous solution.

3. The method of claim 1, wherein the aqueous sample is an aqueous suspension.

4. The method of claim 1, wherein the aqueous sample has a volume of greater than 100 ml, 1000 ml, or 10000 ml.

5. The method of claim 1, wherein the temperature is below −4° C., −5° C., −6° C., −7° C., −8° C., −9° C., −10° C., −11° C., −12° C., −13° C., −14° C., −15° C.,-16° C., −17° C., −18° C., −19° C., or −20° C.

6. The method of claim 1, wherein the immiscible liquid phase comprises mineral oil, paraffin oil, olive oil, nutmeg oil, or a mixture thereof.

7. The method of claim 1, wherein the immiscible liquid phase comprises one or more compounds selected from the group consisting of alkanes, alkenes, alkynes, benzenes, alcohols, alkanoic acids, aldehydes, ketones, esters, polydimethylsiloxane (PDMS), and derivatives thereof.

8. The method of claim 7, wherein the immiscible liquid phase consists of one compound selected from the group consisting of alkanes, alkenes, alkynes, benzenes, alcohols, alkanoic acids, aldehydes, ketones, esters, polydimethylsiloxane (PDMS), and derivatives thereof.

9. The method of claim 1, wherein the immiscible liquid phase comprises a primary alcohol.

10. The method of claim 9, wherein the primary alcohol is 1-pentanol ($CH_3(CH_2)_3CH_2OH$) or 1-hexanol ($CH_3(CH_2)_4CH_2OH$).

11. The method of claim 9, wherein the immiscible liquid phase consists of a primary alcohol.

12. The method of claim 9, wherein the immiscible liquid phase consists of 1-pentanol ($CH_3(CH_2)_3CH_2OH$) or 1-hexanol ($CH_3(CH_2)_4CH_2OH$).

13. The method of claim 1, wherein the immiscible liquid phase comprises undecane ($CH_3(CH_2)_9CH_3$).

14. The method of claim 1, wherein the aqueous sample is maintained in supercooled state for more than 10 days, 20 days, 30 days, 40 days, 50 days, 60 days, 70 days, 80 days, 90 days, 100 days, or 300 days.

15. The method of claim 14, wherein, after the sample is maintained in a supercooled state, the method further comprises heating the aqueous sample to a temperature that is above 0° C.

16. The method of claim 1, wherein the biological sample is perfused with and/or submerged in the aqueous sample.

17. The method of claim 1, wherein the biological sample is a cell, a tissue sample, an organ, or an organism.

18. The method of claim 17, wherein the organ is a liver, a heart, a lung, an eye, or a kidney.

19. The method of claim 1, wherein the biological sample comprises blood.

20. The method of claim 1, wherein the aqueous sample comprises a cold storage solution.

21. The method of claim 20, wherein the aqueous sample further comprises PEG.

22. The method of claim 20, wherein the aqueous sample further comprises trehalose.

23. The method of claim 20, wherein the aqueous sample further comprises 3-O-methyl glucose (3-OMG).

24. The method of claim 1, wherein the biological sample can be cryopreserved for more than 7 days, 10 days, 1 month, 2 months, or 3 months while maintaining viability.

25. The method of claim 1, wherein the aqueous sample further comprises an anti-nucleation agent.

26. The method of claim 1, wherein the aqueous sample further comprises a cryoprotective agent.

27. The method of claim 1, wherein supercooling the sample comprises lowering the temperature by 0.1 to 10° C. per minute.

28. The method of claim 1, wherein a volume of the immiscible liquid phase is greater than 0.1 ml.

* * * * *